US011983650B2

(12) United States Patent
Aerni et al.

(10) Patent No.: US 11,983,650 B2
(45) Date of Patent: May 14, 2024

(54) INTELLIGENT ROUTING OF DATA OBJECTS BETWEEN PATHS USING MACHINE LEARNING

(71) Applicant: Salesforce, Inc., San Francisco, CA (US)

(72) Inventors: Sarah Joann Aerni, San Francisco, CA (US); Zineb Laraki, Atherton, CA (US); Penny Tselikis, San Francisco, CA (US); Till Christian Bergmann, San Mateo, CA (US); Michael Weil, New York, NY (US); Christian Posse, Belmont, CA (US); Jason Teller, Arcadia, CA (US); Alex Edelstein, San Francisco, CA (US); Mehmet Ezbiderli, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 153 days.

(21) Appl. No.: 17/589,763

(22) Filed: Jan. 31, 2022

(65) Prior Publication Data
US 2023/0245010 A1 Aug. 3, 2023

(51) Int. Cl.
*G06Q 10/0631* (2023.01)
(52) U.S. Cl.
CPC .......................... *G06Q 10/063112* (2013.01)
(58) Field of Classification Search
CPC .... G06Q 10/06; G06Q 10/103; G06Q 10/067; G06Q 10/0633; G06Q 10/0639; G06Q 10/10; G06Q 10/06316
See application file for complete search history.

(56) References Cited

U.S. PATENT DOCUMENTS 7,272,817 B1\* 9/2007 Hinkle ................... G06Q 40/00
703/27
7,289,966 B2\* 10/2007 Ouchi .............. G06Q 10/06311
705/7.26
7,908,161 B2\* 3/2011 Benayon ............ G06Q 10/0633
705/7.11
(Continued)

OTHER PUBLICATIONS

Voorhoeve, M. et al., Ad-hoc Workflow: Problems and Solutions IEEE, 1997 (Year: 1997).\*
(Continued)

*Primary Examiner* — Scott L Jarrett
(74) *Attorney, Agent, or Firm* — Holland & Hart LLP

(57) ABSTRACT

Methods, systems, apparatuses, devices, and computer program products are described. An intelligent routing system may route a data object to a path in a process flow using a model, such as a machine-learned model. The system may receive a first data object and may route the first data object along a path of the process flow using a random routing procedure, for example, for model training. The routing may involve performing operations based on the path and the features of the first data object. The system may update one or more models based on an outcome of the operations. Following training, the system may insert a model into the process flow at a decision point between paths. The system may receive a second data object and may route the second data object to a path using the model and based on features of the second data object.

15 Claims, 13 Drawing Sheets

(56) References Cited

U.S. PATENT DOCUMENTS

| | | | | |
|---|---|---|---|---|
| 8,229,964 B2* | 7/2012 | Sattler | | G06Q 40/02 |
| | | | | 707/796 |
| 8,265,979 B2* | 9/2012 | Golani | | G06Q 10/10 |
| | | | | 705/7.27 |
| 8,583,466 B2* | 11/2013 | Margulies | | G06Q 10/10 |
| | | | | 705/7.26 |
| 8,645,276 B2* | 2/2014 | Wong | | G06Q 10/04 |
| | | | | 705/50 |
| 9,542,175 B2* | 1/2017 | Tseitlin | | G06F 8/71 |
| 9,779,367 B2* | 10/2017 | Jonath | | G06Q 10/06 |
| 9,851,951 B1* | 12/2017 | Ganesan | | G06F 8/30 |
| 10,430,387 B2* | 10/2019 | Falkenberg | | G06Q 10/06 |
| 10,664,777 B2* | 5/2020 | Volkov | | G06Q 10/0633 |
| 10,713,594 B2* | 7/2020 | Szeto | | G06N 20/00 |
| 10,768,905 B2* | 9/2020 | Leen | | G06F 8/30 |
| 10,929,367 B2* | 2/2021 | Bansal | | G06F 16/13 |
| 10,963,231 B1* | 3/2021 | Singh | | G06F 11/3466 |
| 11,418,432 B1* | 8/2022 | Belussi | | H04L 45/38 |
| 11,688,111 B2* | 6/2023 | Wang | | G06F 3/0481 |
| | | | | 715/711 |
| 2003/0036934 A1* | 2/2003 | Ouchi | | G06Q 10/06316 |
| | | | | 705/7.13 |
| 2003/0083915 A1* | 5/2003 | Guicciardi | | G06Q 10/0633 |
| | | | | 705/7.27 |
| 2003/0233374 A1* | 12/2003 | Spinola | | G06Q 10/08 |
| 2005/0027585 A1* | 2/2005 | Wodtke | | G06Q 10/06316 |
| | | | | 705/7.26 |
| 2005/0043976 A1* | 2/2005 | Leehman | | G06Q 10/06 |
| | | | | 705/7.39 |
| 2005/0144150 A1* | 6/2005 | Ramamurthy | | G06Q 10/06 |
| | | | | 706/45 |
| 2006/0167923 A1* | 7/2006 | Casati | | G06Q 10/06 |
| | | | | 707/999.102 |
| 2006/0247965 A1* | 11/2006 | Griffith | | G06Q 10/06 |
| | | | | 705/348 |
| 2007/0061283 A1* | 3/2007 | Lakhotia | | G06Q 10/10 |
| 2007/0179822 A1* | 8/2007 | Benayon | | G06Q 10/06393 |
| | | | | 705/70 |
| 2007/0179826 A1* | 8/2007 | Cutlip | | G06Q 10/06 |
| | | | | 705/7.11 |
| 2007/0250574 A1* | 10/2007 | Tseitlin | | G06F 8/71 |
| | | | | 709/205 |
| 2007/0266051 A1* | 11/2007 | Moore | | G06Q 10/067 |
| 2008/0155503 A1* | 6/2008 | Klein | | G06F 8/24 |
| | | | | 717/120 |
| 2009/0112663 A1* | 4/2009 | Benayon | | G06Q 10/063 |
| | | | | 715/709 |
| 2010/0125846 A1* | 5/2010 | Da Silva | | G06F 9/5038 |
| | | | | 718/100 |
| 2010/0174583 A1* | 7/2010 | Passova | | G06Q 10/0633 |
| | | | | 705/348 |
| 2011/0320382 A1* | 12/2011 | Kudo | | G06Q 10/067 |
| | | | | 705/348 |
| 2012/0310699 A1* | 12/2012 | McKenna | | G06Q 10/00 |
| | | | | 705/7.26 |
| 2013/0066665 A1* | 3/2013 | Tamhane | | G06Q 30/02 |
| | | | | 705/7.12 |
| 2013/0268251 A1* | 10/2013 | Demuth | | G06Q 10/067 |
| | | | | 703/6 |
| 2013/0311583 A1* | 11/2013 | Humphreys | | H04L 51/214 |
| | | | | 709/206 |
| 2014/0207506 A1* | 7/2014 | Palmert | | G06F 16/248 |
| | | | | 705/7.15 |
| 2014/0288985 A1* | 9/2014 | Debow | | G06Q 10/06 |
| | | | | 705/7.15 |
| 2015/0324241 A1* | 11/2015 | Curbera | | G06Q 10/04 |
| | | | | 718/106 |
| 2018/0060737 A1* | 3/2018 | Ezry | | G06N 7/01 |
| 2018/0101571 A1* | 4/2018 | Zhang | | G06F 16/2474 |
| 2018/0308022 A1* | 10/2018 | Philips | | G06N 20/00 |
| 2018/0322462 A1* | 11/2018 | Jayaraman | | G06N 5/04 |
| 2020/0004903 A1* | 1/2020 | Gottin | | G06F 30/20 |
| 2020/0143386 A1* | 5/2020 | Tomlinson | | G06Q 30/016 |
| 2020/0210479 A1* | 7/2020 | Bequet | | G06F 16/90344 |
| 2021/0055973 A1* | 2/2021 | Pendar | | G06N 20/00 |
| 2021/0081848 A1* | 3/2021 | Polleri | | G06F 11/3452 |
| 2021/0110207 A1* | 4/2021 | Singh | | G06F 18/2178 |
| 2021/0304139 A1* | 9/2021 | Sridhara | | G06F 40/30 |
| 2022/0036610 A1* | 2/2022 | Wang | | G06N 5/00 |
| 2022/0237532 A1* | 7/2022 | Phadke | | G06Q 10/0637 |
| 2022/0292007 A1* | 9/2022 | Singh | | G06F 11/0769 |
| 2022/0335362 A1* | 10/2022 | Nikain | | G06Q 10/063114 |
| 2022/0382539 A1* | 12/2022 | Gumashta | | G06N 20/00 |
| 2023/0090607 A1* | 3/2023 | Popelka | | H04L 67/62 |
| | | | | 709/219 |
| 2023/0110057 A1* | 4/2023 | Kan | | G06F 16/24578 |
| | | | | 707/723 |
| 2023/0117225 A1* | 4/2023 | Porto Guedes | | G06Q 10/0633 |
| | | | | 705/7.27 |

OTHER PUBLICATIONS

Lakshmanan, Geetika T. et al., A Markov prediction model for data-driven semi-structured business processes Knowledge Information Systems, vol. 42, 2015 (Year: 2015).*

Herbst, Joachim et al., Integrating Machine Learning and Workflow Management to Support Acquisition and Adaption of Workflow Models, Proceedings Ninth International Workshop on Database and Expert Systems Applications, Aug. 1998 (Year: 1998).*

Heinl, Petra et al., A Comprehensive Approach to Flexibility in Workflow Management Systems WACC'99, ACM 1999 (Year: 1999).*

* cited by examiner

INTELLIGENT ROUTING OF DATA OBJECTS BETWEEN PATHS USING MACHINE LEARNING

FIELD OF TECHNOLOGY

The present disclosure relates generally to database systems and data processing, and more specifically to intelligent routing of data objects between paths using machine learning.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems in which an organization implements a process flow for handling data objects. The process flow may include a path through which a data object can flow, where the path includes one or more operations to perform on or using the data object. In some cases, the organization may evaluate multiple different paths. For example, the organization may use an A/B test to test out different paths in order to select a path for implementation in a process flow. However, in some cases, the selected path may fail to account for underlying aspects of the data objects, resulting in inefficient or ineffective data processing for at least a subset of the data objects.

DETAILED DESCRIPTION

Figure 1:
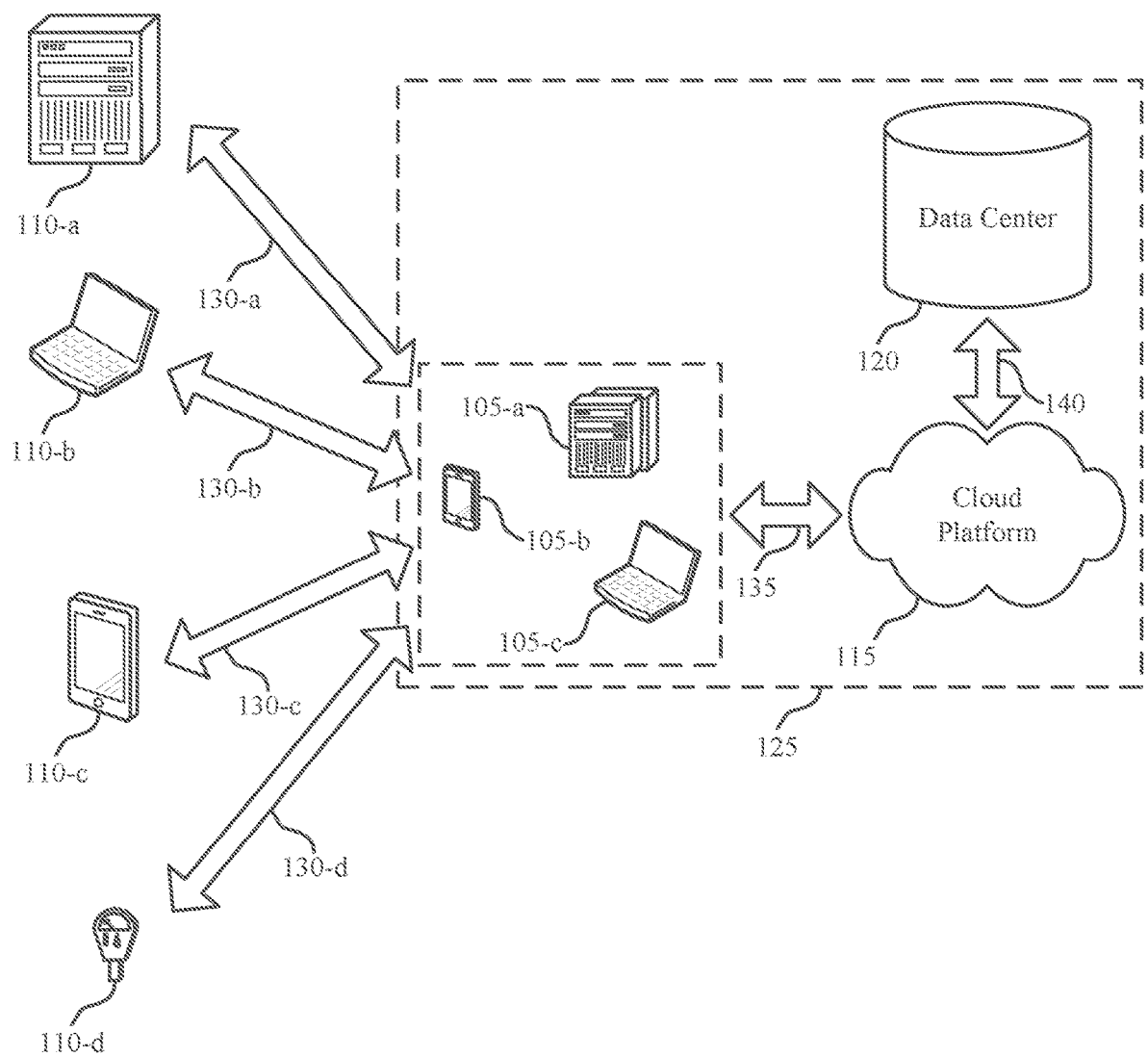
FIG. 1 illustrates an example of a data processing system for cloud computing that supports intelligent routing of data objects between paths using machine learning in accordance with aspects of the present disclosure.

Some database systems may support a model for intelligently routing data objects between different paths in a process flow. For example, the database system may store data objects, where each data object has a set of features. In some examples, the database system may implement a routing procedure in which a data object is routed to a path of a process flow using a model (e.g., a machine-learned model, an algorithm, or the like). The model may use different types of data values of the data object (e.g., numbers, strings, categorical values, and the like), and a system may perform data preparation (e.g., using a machine learning transmogrify library) to transform data values based on the type and attributes, or the features, of the data object. The model may use the transformed data in order to output an indication of a path in the process flow (e.g., a prediction of a "best" path for the data according to one or more metrics).

Techniques described herein support routing data objects between paths of process flows (e.g., workflows in a database system) by implementing and updating one or more models. A model may be a machine learning model or other algorithm that receives one or more features of a data object as an input and determines a path within a process flow for the data object as an output, for example, based on one or more layers, weights, nodes, or some combination thereof for the model. The database system may perform a random routing procedure for a data object to determine key performance indicators (KPIs) for different paths of a process flow. That is, the database system may use the random routing during a model training phase for a process flow. In some cases, routing a data object to a path of the process flow may involve performing operations corresponding to the path which may use one or more features of the data object. The database system may update one or more models using the outcome of the operations, such that the database system may generate and update multiple models for determining routing of data objects. Each model of the one or more models may define a different process for dynamically determining a path in the process flow for a data object. That is, the database system may insert a model into the process flow to aid in determining which path to use for routing a data object.

In some examples, a user device may provide a KPI (e.g., a user-defined KPI) for the process flow, which the database system may use when determining a path to use for routing a data object. Once the database system updates the model, the database system may send an indication of the model to a user device. A user operating the user device may in turn select a model to insert into the process flow. In some cases, the database system may store training information that includes information related to randomly routing data objects. The database system may detect a potential bias in the random routing procedure and may send an indication of the potential bias to a user device. Based on a user input, the user device may send a request to ignore the potential bias, a request to address the potential bias, or the like. The database system may retrain the model one or more times, which—in some examples— may include deactivating the model based on an update to the process flow prior to retraining.

Aspects of the disclosure are initially described in the context of an environment supporting an on-demand database service. Aspects of the disclosure are then described in the context of computing architectures, routing procedures, user interfaces, and process flows. Aspects of the disclosure are further illustrated by and described with reference to apparatus diagrams, system diagrams, and flowcharts that relate to intelligent routing of data objects between paths using machine learning.

FIG. 1 illustrates an example of a data processing system 100 for cloud computing that supports intelligent routing of data objects between paths using machine learning in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

One or both of the cloud platform 115 and the subsystem 125 may support a database system (e.g., a multi-tenant database system) which may support an intelligent routing procedure for routing data between different operations or processes using machine learning. As described herein, the database system (e.g., including the data center 120) may support systems which train a model (e.g., machine learning model, algorithm, heuristics, or the like) for routing data objects from a database through different processes. For example, the database system may store data objects at the data center 120, where the data objects have one or more fields or parameters that indicate attributes, or features, of the data objects. In some examples, a user (e.g., a cloud client 105, a contact 110) may use the data objects to analyze patterns in a process. The features of a data object may relate to the current state of the data object, historical information relating to the data object over time, or both. Additionally or alternatively, the processes within a process flow may include any types of actions performed by users, such as sending or receiving email messages or text messages, creating new data objects, modifying data objects, scheduling meetings, archiving data, creating documents, or any combination of these or other actions.

Some other database systems may compare different operations to select an operation to apply to data objects. For example, the database system may select a path of a process flow by comparing KPIs for each path. However, routing all data objects along the selected path may fail to account for differences in the data objects, such as one or more features of the data objects. Analyzing the potential paths and selecting one "best" path may reduce the effectiveness of a process flow, based on the "best" path (e.g., according to one or more KPIs) not being the same across data objects, users, or both. For example, the "best" path corresponding to a most favorable outcome for handling an order data object with a relatively small price field value (e.g., below one hundred dollars) may be different from the "best" path for handling an order data object with a relatively large price field value (e.g., above ten thousand dollars). A system defining or determining a process flow that handles these data objects in the same way may fail to support dynamic, reliable, and effective management of such data objects.

In contrast, the data processing system 100 may support the use of a model at a decision point in a process flow to intelligently route a data object between paths. In some cases, a database system may train multiple models based on randomly routing data objects to different potential paths of a process flow. The routing may include performing operations using the features of the data objects. For example, a database system may randomly route invoices down an automated collection process or a manual collection process and may collect KPIs for each process, as well as collect data associated with the data objects (e.g., invoices) resulting in the KPIs for each process. Using this data, the data processing system 100 may train one or more models for intelligently routing between the automated collection process and the manual collection process. The data processing system 100 or a user of the data processing system 100 may select a model to use based on one or more performance metrics of the model. The data processing system 100 may insert the model at the decision point between the automated collection process and the manual collection process. For invoices (e.g., example data objects) received after the model is installed, one or more features of a respective invoice may be fed into the model, and the model may output a path for routing the invoice. For example, the invoice may have a field with a field value correlated with a greater probability of success (e.g., of the invoice being paid) if the invoice is routed down a specific path. As such, the data processing system 100 may intelligently route data objects down different paths of process flows based on one or more machine-learned models, which may improve the effectiveness of the process flows across the set of data objects processed in the system (e.g., data objects with different features, processes performed by different users).

It should be appreciated by a person skilled in the art that one or more aspects of the disclosure may be implemented in a data processing system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
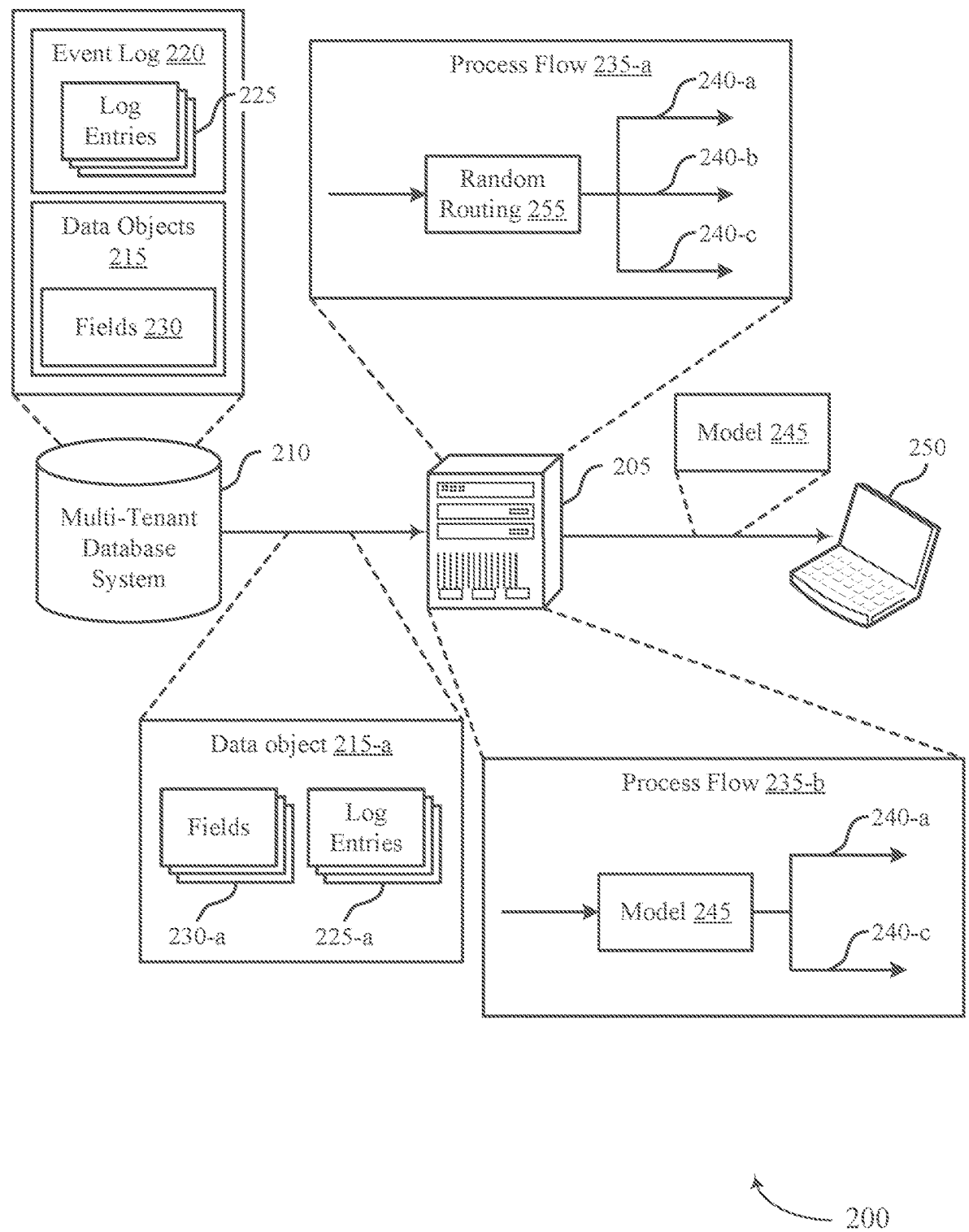
FIG. 2 illustrates an example of a computing architecture that supports intelligent routing of data objects between paths using machine learning in accordance with aspects of the present disclosure.

FIG. 2 illustrates an example of a computing architecture 200 that supports intelligent routing of data objects between paths using machine learning in accordance with aspects of the present disclosure. The computing architecture 200 may implement or be implemented by aspects of the data processing system 100. For example, the computing architecture 200 may include an intelligent routing system 205 operating in a multi-tenant database system 210, which may be implemented by aspects of a cloud platform 115 or a subsystem 125 described with reference to FIG. 1. The multi-tenant database system 210 may be an example of any data storage system, including cloud resources, database resources, or any other resources. The intelligent routing system 205 may be any device configured for performing intelligent routing procedures, such as an application server, a database server, a cloud-based server, a server cluster, a virtual machine, a container, or any combination of these or other devices or device components supporting data processing.

As described herein, the computing architecture 200 may support systems which track detailed records of actions performed within a platform (e.g., a customer relationship management (CRM) platform or other data management platform). For example, the multi-tenant database system 210 may store an event log 220. The event log 220 may store multiple log entries 225 for a tenant of the multi-tenant database system 210 (e.g., the event log 220 may be tenant-specific or may keep event data for each tenant siloed from other tenant data). In some cases, the event log 220 may track actions performed by users associated with the tenant, and the event log 220 may be automatically updated based on a user performing an action in the multi-tenant database system 210. The logs entries 225 may track event records that capture customer behavior, implicit feedback, and user activities and actions performed on different data objects or otherwise performed across the multi-tenant database system 210. For example, a log entry 225 may track actions such as searching a website, typing into a field, logging into a user account, creating a user account, creating a data object, editing a data object, saving a data object, sending an email, sending a calendar invite, sending an SMS message, searching a webpage, clicking on a link, or any other activities that a user may perform within a platform (e.g., such as activities performed on a data object 215). In addition, a log entry 225 may include a set of fields which may indicate information relating to a respective event, such as a data object type, a specific data object of the data object type (e.g., the data object 215), a timestamp for the event, a user identifier (e.g., corresponding to the user who performed the event triggering creation of the log entry 225), a client session identifier, an event classification, or any combination thereof.

In addition to the event log 220, the multi-tenant database system 210 may store data objects 215. The data object storage may store multiple data objects 215 of one or more data object types, including respective fields 230 for the data objects 215. The fields 230 may define a current set of features associated with the data objects 215. In some cases, the multi-tenant database system 210 may additionally store, for a data object 215, a history field tracking actions performed on or using the data object 215. The history field may store chronological records of actions performed on the data object 215 and may include a further set of fields. The set of fields may indicate a field of the data object (e.g., a field affected by the action), a timestamp (e.g., at which time the action was processed), a user identifier (e.g., corresponding to the user who triggered the action), an original value for the field (e.g., before the action was performed), a current value for the field (e.g., after the action is performed), or any combination thereof.

The multi-tenant database system 210 may further store one or more process flows (e.g., workflows). The process flows may define common sequences of operations to perform within the multi-tenant database system 210 (e.g., on a data object 215). The process flows may include automated processes, user-performed processes, or a combination thereof. Process flows may be tenant-specific or common across tenants. Improving the reliability and efficiency of the process flows may significantly improve the functionality of the multi-tenant database system 210, because multiple users may frequently use the process flows for data processing operations.

In some examples, the intelligent routing system 205 may use a model 245 to determine paths 240 to use for a data object 215 within a process flow. By using the model 245 to route the data object 215, the intelligent routing system 205 may efficiently process the data object 215, which may optimize a portion of the process flow 235-b. In some examples, the intelligent routing system 205 may implement A/B testing to acquire training data, which is described in further detail with respect to FIG. 3. For example, the intelligent routing system 205 may receive a data object from the multi-tenant database system 210. The intelligent routing system 205 may randomly route the data object 215 to one of path 240-a, path 240-b, or path 240-c in a process flow 235-a (e.g., using random routing 255, which may involve random or pseudo-random selection of a path 240 for processing). The random routing 255 may provide training data to the intelligent routing system 205 (e.g., based on outcomes of the different paths 240 for different data objects 215). The intelligent routing system 205 may use the training data to train multiple models 245, which is described in further detail with respect to FIG. 4. The models 245 may be machine learning models configured to take a data object 215, A/B testing parameters, outcome information for the paths, or a combination thereof as inputs, and the models 245 may output a recommended path 240 of the process flow 235. The A/B testing parameters may indicate to which path 240 a data object 215 was routed. For example, the A/B testing parameters may indicate whether a data object 215 is treated or a control, which is described in further detail with respect to FIGS. 3 and 4. Additionally or alternatively, the A/B testing parameters may indicate different ways a data object 215 was treated corresponding to different paths 240. In this way, the intelligent routing system 205 may analyze any number of paths 240 of a process flow 235-a.

In some cases, the intelligent routing system 205 may perform feature engineering to convert data fields 230 (e.g., such as a history field or other fields) of a data object 215 into numerical vectors for use in model training. Additionally or alternatively, the intelligent routing system 205 may use an event log 220 including log entries 225 to determine a subset of log entries 225 relating to the data object 215. The subset of log entries may be used to determine different paths of a process flow 235, different metrics for machine learning, or both. For example, the intelligent routing system 205 may identify a data object 215-a as an input to a process flow 235-b. The intelligent routing system 205 may randomly route the data object 215-a to path 240-c and may determine data relating to the output of the processing of the data object 215-a by the path 240-c. The intelligent routing system 205 may transform one or more data fields 230-a of the data object 215-a, one or more log entries 225-a corresponding to the data object 215-a (e.g., storing logs of actions performed on the data object 215-a), or both into a form usable by machine learning models. For example, a transmogrifier may use a transmogrify procedure to generate numerical values or vectors corresponding to non-numerical values of the one or more data fields 230-a, of fields of the one or more log entries 225-a, or a combination thereof. The intelligent routing system 205 may input the transformed values, the data relating to the output of the processing of the data object 215-a, information indicating the path 240-c to which the data object 215-a was routed, or a combination thereof into one or more machine learning models to train the models 245.

Additionally or alternatively, the intelligent routing system 205 may use the training data to identify potential bias for one or more models 245. The intelligent routing system 205 may run tests on the numerical vectors used for model training corresponding to different paths 240 to determine a distribution of data fields 230 of the data objects 215 across data paths 240. The intelligent routing system 205 may use one or more algorithms to find the distribution for numerical fields or categorical fields, which may be in the form distance or divergence for a numerical field. Similarly, the intelligent routing system 205 may use a difference in fill rate or a ratio of fill rates, where the fill rate is a number of null values or fields in the data objects 215. If there is a relatively large difference in fill rate or distribution in the training data used to train a model 245 for different paths 240, there may be a potential bias in the A/B testing. For example, if the random routing 255 sends a significant proportion of data objects 215 associated with a specific account to path 240-a as compared to paths 240-b and 240-c, this random routing 255 may potentially introduce bias into the model training (e.g., if the specific account is in some way correlated with processing in the process flow 235-a). The intelligent routing system 205 may indicate the potential bias to the user device 250, and the user device 250 may send a request to ignore the potential bias, a request to address the potential bias, or the like. For example, a user may view the indicated potential bias in a user interface of the user device 250 and determine whether the potential bias should be addressed (e.g., based on the user's understanding of how a difference in fill rate or distribution could skew results of the model training). To address potential bias, the intelligent routing system 205 may refrain from installing a model 245 that may be affected by the bias. If the potential bias is ignored, a model 245 potentially affected by the bias may be eligible for insertion into a process flow 235-b.

In some examples, the intelligent routing system 205 may send an indication of the models 245 to a user device 250. The user device 250 may send a selection of a model 245 in response to the indication. For example, a user operating the user device 250 may select a model 245 to insert into the process flow 235-b. Additionally or alternatively, the user device 250 may send one or more KPIs to the intelligent routing system 205, and the intelligent routing system 205 may use the KPIs to select a model 245. The intelligent routing system 205 may implement the selected model 245 in the process flow 235-b at a decision point between paths 240, such as between path 240-a and path 240-c. In the example illustrated in FIG. 2, the intelligent routing system 205 may determine path 240-b is not as effective as path 240-a or path 240-c. However, path 240-a and path 240-c may be useful in different scenarios (e.g., based on different features of data objects or different actions performed in the database system). As such, the model 245 may intelligently route between path 240-a and path 240-c to improve the functionality and reliability of the process flow 235-b.

The intelligent routing system 205 may receive an additional data object 215 from the multi-tenant database system 210. In some cases, the intelligent routing system 205 may use the model 245 to select between one or more paths 240 in the process flow 235-b, such as path 240-a and path 240-c, for the additional data object 215, which is described in further detail with respect to FIG. 5. In some examples, the intelligent routing system 205 may output one or more KPIs resulting from processing the additional data object 215 to the user device 250.

Figure 3:
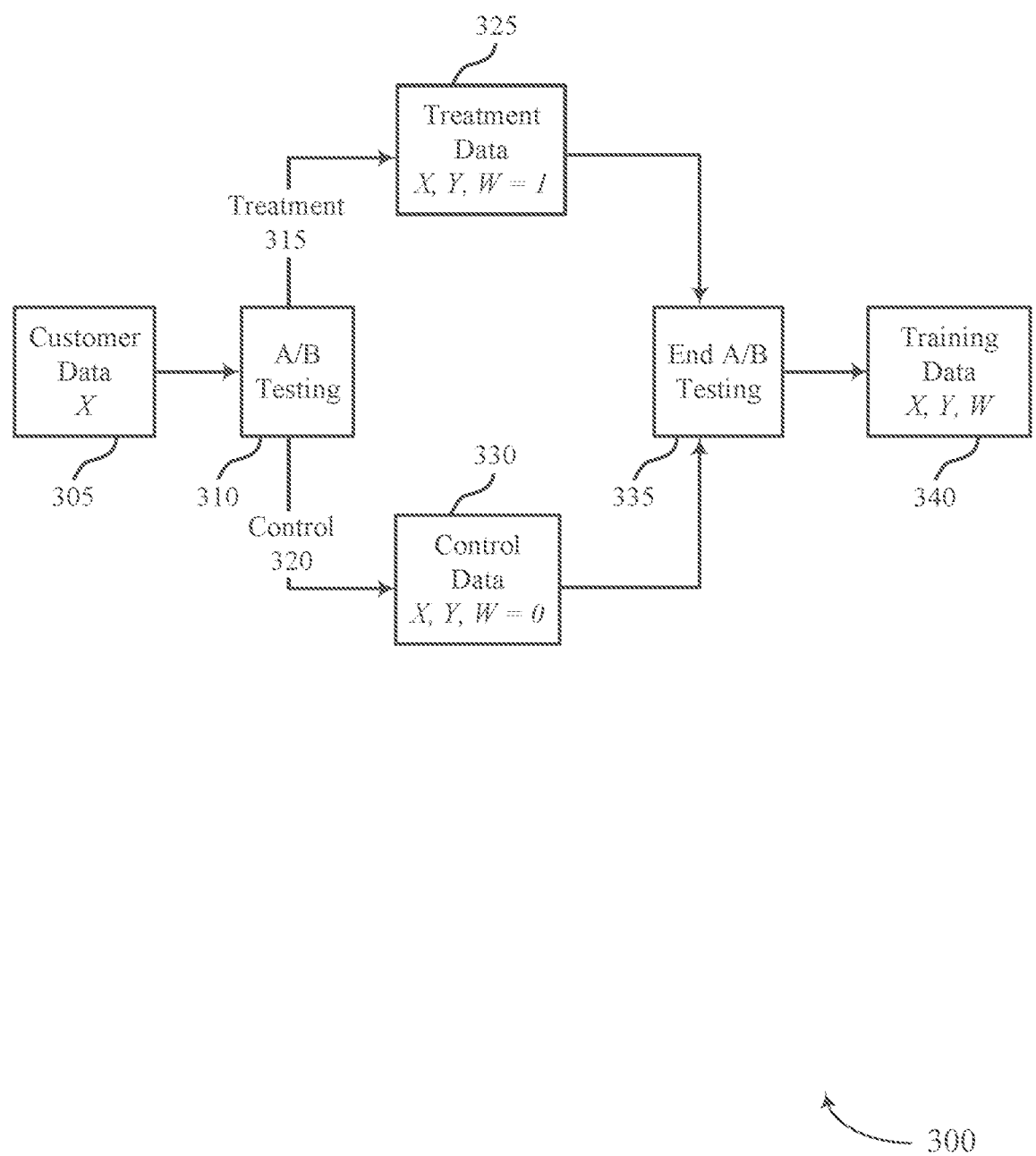
FIGS. 3 through 5 illustrate examples of routing procedures that support intelligent routing of data objects between paths using machine learning in accordance with aspects of the present disclosure.

FIG. 3 illustrates an example of a routing procedure 300 that supports intelligent routing of data objects between paths using machine learning in accordance with aspects of the present disclosure. The routing procedure 300 may implement or be implemented by aspects of the data processing system 100 or the computing architecture 200. For example, the routing procedure 300 may be implemented by a database system (e.g., a multi-tenant database system) supporting an intelligent routing procedure for process flows. In some examples, a processing device (e.g., an application server, a database server, a cloud-based server, a worker server, a server cluster, a virtual machine, a container, or any combination of these or other devices or systems configured to perform data processing) may perform the routing procedure 300. The routing procedure 300 may include a training procedure for A/B testing.

In some examples, a user may define a target for an A/B test (e.g., a KPI, a threshold) and may send data through a data pipeline (e.g., a process flow or workflow). For example, at 305, the user or the database system may send customer data as an input to an A/B test. The customer data may have a set of features, X The set of features may be stored as field values in a data object. In some examples, the customer data may be sent as an input to the routing procedure 300 based on a user selecting to process the customer data. In some other examples, the customer data may be sent as the input to the routing procedure 300 in response to receiving the customer data at the database system. In yet some other examples, the database system may periodically or aperiodically process customer data stored in the database system.

In some examples, at 310, the customer data may be fed through an A/B test to acquire training data. The data may be divided into a treatment set of data 315 that may be treated with a process and a control set of data 320 that may not be treated. That is, the system may perform some form of intervention on the treatment set of data 315, such as modifying the data, automatically performing one or more processes using the data, or otherwise intervening in the processing of the treatment set of data 315. In contrast, the system may refrain from intervening with the control set of data 320. In some examples, the percentage of data sent for treatment may be configured, such as 50% of the data for treatment, 70% of the data for treatment, or the like. The data may be divided into the treatment set of data 315 and the control set of data 320 randomly. It is to be understood that the routing procedure 300 may support any quantity of different paths, treatments, or the like. For example, the A/B testing may randomly route the data between more than two paths corresponding to different treatments of the data (e.g., different sequences of operations corresponding to each path of the process flow).

Based on the routing, the system may assign a treatment indicator or path identifier to the data indicating which path processed the data. For example, the data may include a treatment assignment column with a value, W, that indicates whether the data was in the treatment set of data 315 or in the control set of data 320. In some examples, at 325, the treatment set of data 315 may be processed and may have a result or outcome. Similarly, at 330, the control set of data 320 may be processed and may have a same or different outcome as the treated set of data 315. In some cases, each data object being processed may either be included in the treatment set of data 315 or in the control set of data 320, but not both (e.g., to avoid duplicate processing of data).

At 335, at the end of A/B testing, the system may determine a response value, Y, based on a result of the data processing. In some examples, the response value, Y, may be a KPI indicating a positive or negative outcome. In the example of an invoice, the response value may indicate whether or not the invoice was paid on time. In some cases, the system may perform further processing of the results from the A/B test. For example, the system may detect potential bias based on performing feature engineering, such as converting the fields into numerical vectors and running tests (e.g., distribution or difference tests) across data sets sent to different paths in the process flow. If the tests result in potential bias, the system may notify a user device of the bias. The system may filter or balance the bias by selectively removing confounding variables or data that may cause inaccurate results or by rerunning the random routing in the A/B test.

At 340, the result of the A/B test may be a set of training data including X, Y, and W, which may be used for machine learning model training and—in some cases—evaluated for bias. That is, the training data may indicate for a given path (e.g., indicated by W), a data object with the features X resulted in a response Y. By performing the A/B testing on a threshold quantity of data objects (e.g., tens, hundreds, or thousands of objects), the system may build a robust set of training data that may support gaining insights into which paths lead to preferred responses when performed on specific types of data objects or data features. Such insights may support machine learning procedures and model training.

Figure 4:
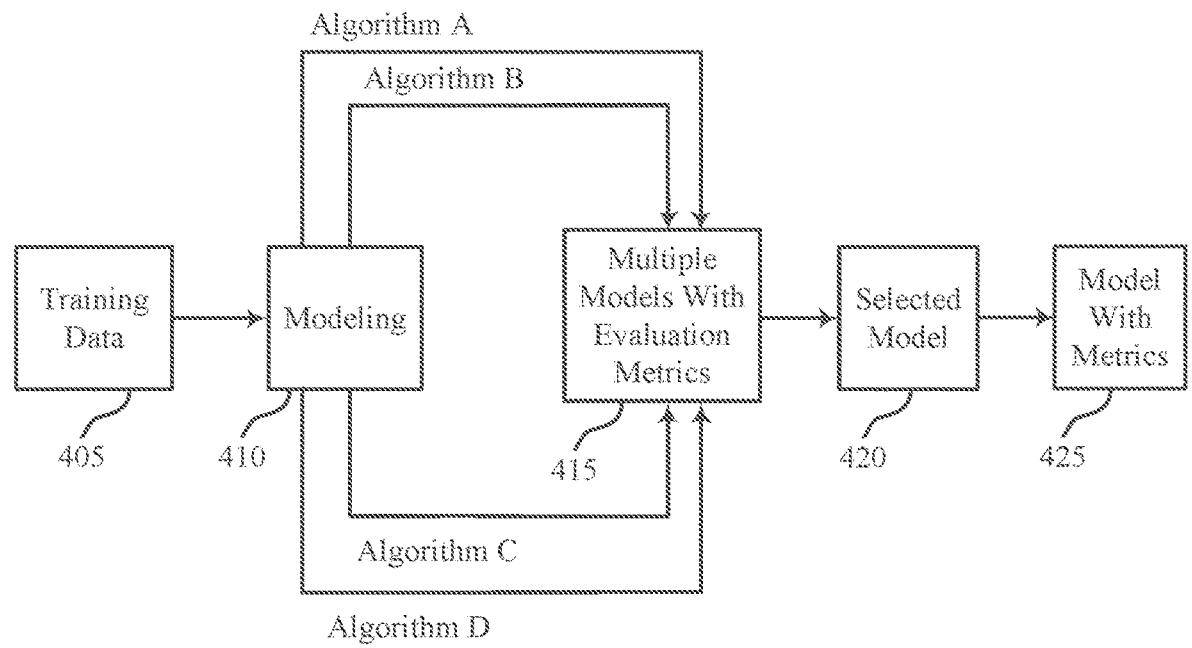

FIG. 4 illustrates an example of a routing procedure 400 that supports intelligent routing of data objects between paths using machine learning in accordance with aspects of the present disclosure. The routing procedure 400 may implement or be implemented by aspects of the data processing system 100, the computing architecture 200, or the routing procedure 300. For example, the routing procedure 400 may be implemented by a database system (e.g., a multi-tenant database system) supporting an intelligent routing procedure implementing a model for routing data to paths in a process flow. In some examples, a processing device (e.g., an application server, a database server, a cloud-based server, a worker server, a server cluster, a virtual machine, a container, or any combination of these or other devices or systems configured to perform data processing) may perform the routing procedure 400. The routing procedure 400 may involve a procedure for selecting a model (e.g., a machine-learned model) for intelligently routing data in a process flow based on training data from A/B testing (e.g., the training data determined at 340 as described with reference to FIG. 3).

In some examples, an intelligent routing system may use training data from an A/B test to train a model, such as a machine learning model, one or more algorithms, heuristics, or the like, for selecting a path in a process flow. At 405, the system may input the training data from an A/B test into one or more models. At 410, the system may develop the models based one or more algorithms, such as algorithm A, algorithm B, algorithm C, and algorithm D. The system may support any quantity of algorithms, models, or both for analysis and training. Each algorithm may produce a different model and may be an example of any machine learning algorithm (e.g., linear regression, support vector machine (SVM) algorithm, Naïve Bayes, logistic regression, and the like). In some cases, the algorithms may include uplift modeling algorithms, such as a two-model approach, an X learner, a tree-based uplift model, or the like. The models may be trained using customer data corresponding to multiple data objects. For each data object, the models may be trained using the corresponding data features, X, a response value from an A/B test, Y, and a value that indicates which path processed the data object, W (e.g., whether the data received treatment in the A/B test or was part of a control data set).

At 415, the system may determine multiple models, each model with corresponding evaluation metrics. The evaluation metrics may include one or more coefficients, such as a Qini coefficient, an adjusted-Qini coefficient, or both for determining the effectiveness of a model. In some cases, the evaluation metrics may additionally or alternatively include one or more visualizations, such as uplift charts or gain charts, to add additional information for evaluating the models. In some examples, determining the effectiveness of a model may involve predicting to which path the model would route a data object (e.g., based on the data object features) and—if the data object was randomly routed that direction—checking whether the response corresponds to a preferred outcome (e.g., an invoice being paid on time, a sale being made). The output of the model may be compared with the response Y and, in some cases, may be fed back to update aspects of the model in order to improve the model's path routing.

At 420, the system may select a model based on the evaluation metrics. For example, the system may select a model corresponding to a highest performance metric, a greatest reliability, or based on any other selection metric. In some cases, at 425, the system may send an indication of the selected model (e.g., with the corresponding metrics) to a user device, and a user operating the user device may select to implement the model based on one or more KPIs, the coefficients, or the like. Additionally or alternatively, the system may surface multiple models to the user device, and the user operating the user device may select a model from the set of multiple models. The system may input the selected model into the corresponding process flow at a decision point between the paths.

Figure 5:
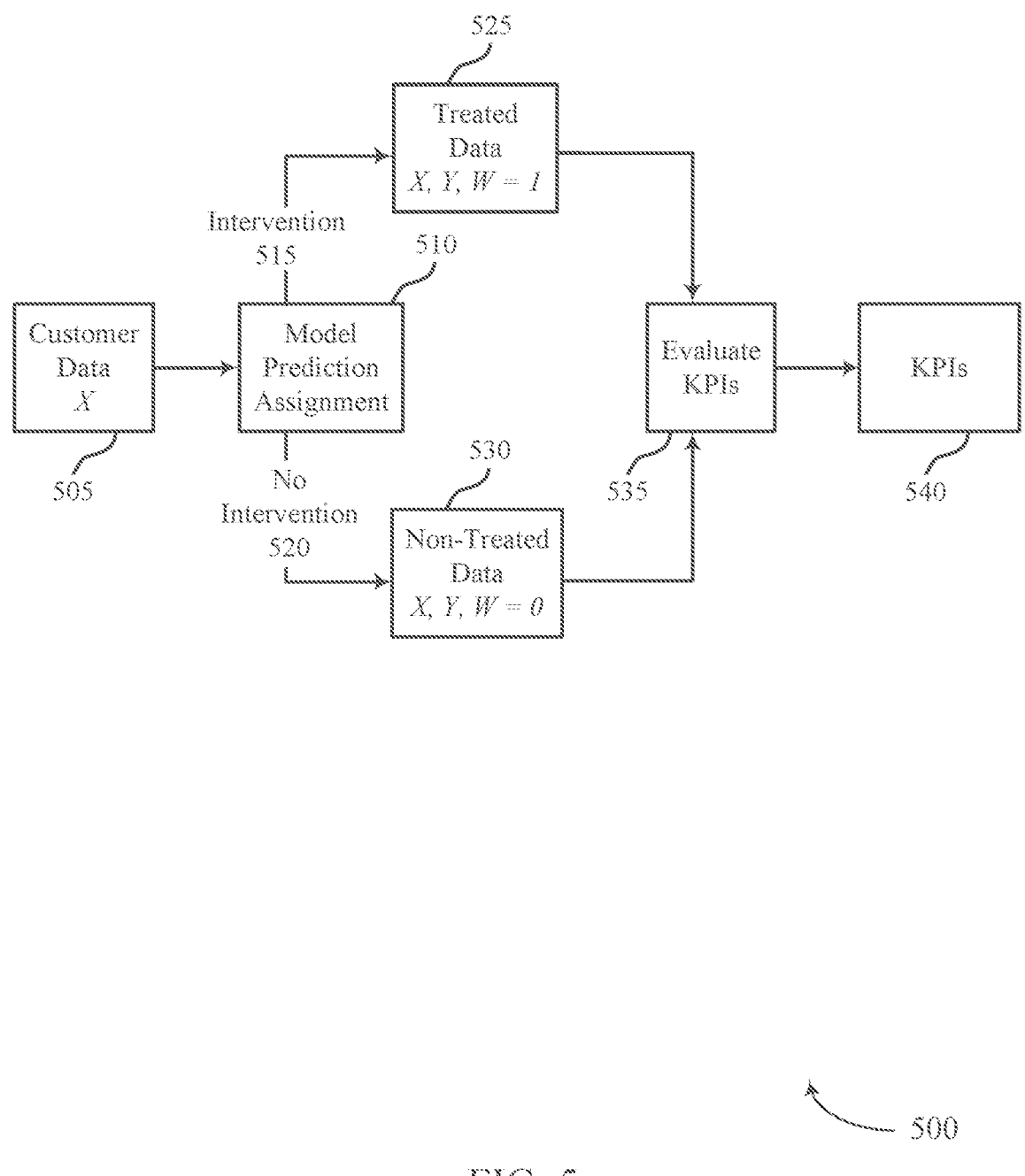

FIG. 5 illustrates an example of a routing procedure 500 that supports intelligent routing of data objects between paths using machine learning in accordance with aspects of the present disclosure. The routing procedure 500 may implement or be implemented by aspects of the data processing system 100, the computing architecture 200, the routing procedure 300, or the routing procedure 400. For example, the routing procedure 500 may be implemented by a database system (e.g., a multi-tenant database system) supporting an intelligent routing procedure implementing a model within a process flow. In some examples, a processing device (e.g., an application server, a database server, a cloud-based server, a worker server, a server cluster, a virtual machine, a container, or any combination of these or other devices or systems configured to perform data processing) may perform the routing procedure 500. The routing procedure 500 may involve a procedure for deploying a selected model (e.g., the model selected at 420 as described with reference to FIG. 4 or otherwise selected by a user) for routing customer data in a process flow.

In some examples, at 505, once an intelligent routing system selects a model as described with reference to FIG. 4, the system may input customer data. The customer data may include one or more variables, which may be represented by a set of features, X The customer data may be received at the database system, input by a user, selected by a user, or stored in the database system.

At 510, the system may send the customer data for model prediction assignment by the model inserted into (e.g., installed in) the process flow. The model prediction assignment may send the data down an intervention path 515 or a no intervention path 520. It is to be understood that the model may route the customer data down a path from any quantity of potential paths corresponding to multiple different types of interventions (e.g., different sequences of data processing operations or actions). If the data is assigned to the intervention path 515, the data may be treated at 525. If the data is assigned to the no intervention path 520, the data may not be treated. Thus, at 530, the data may be non-treated data. The data may be processed by the assigned path, resulting in a response value, Y, based on the treatment. The data may also be assigned a treatment assignment column value, W, that indicates whether the data was treated or not treated (e.g., indicates which path, from a set of multiple paths, processed the specific data object). In some examples, at 525, the treated data may have a result or outcome. Similarly, at 530, the non-treated data may have a same or different outcome as the treated data.

In some examples, at 535, the system may evaluate one or more metrics, such as KPIs, based on the results of the paths. At 540, the system may optionally report the metrics to a user. In some examples, the training and selecting of the model may be an iterative process. For example, the system may retrain the model over different occasions or using different customer data, for example, according to a retraining schedule, based on a change to the process flow, or based on the KPIs performing relatively poorly (e.g., failing to satisfy a threshold). In some cases, the system may reroute a subset of data to a random assignment procedure for additional A/B testing, while the system may send the rest of the data through the currently active model. Based on the retraining, the system may select a different model to install in the process flow or may update one or more aspects of the currently installed model (e.g., changing weights of nodes in a layered model, changing path options).

Figure 6:
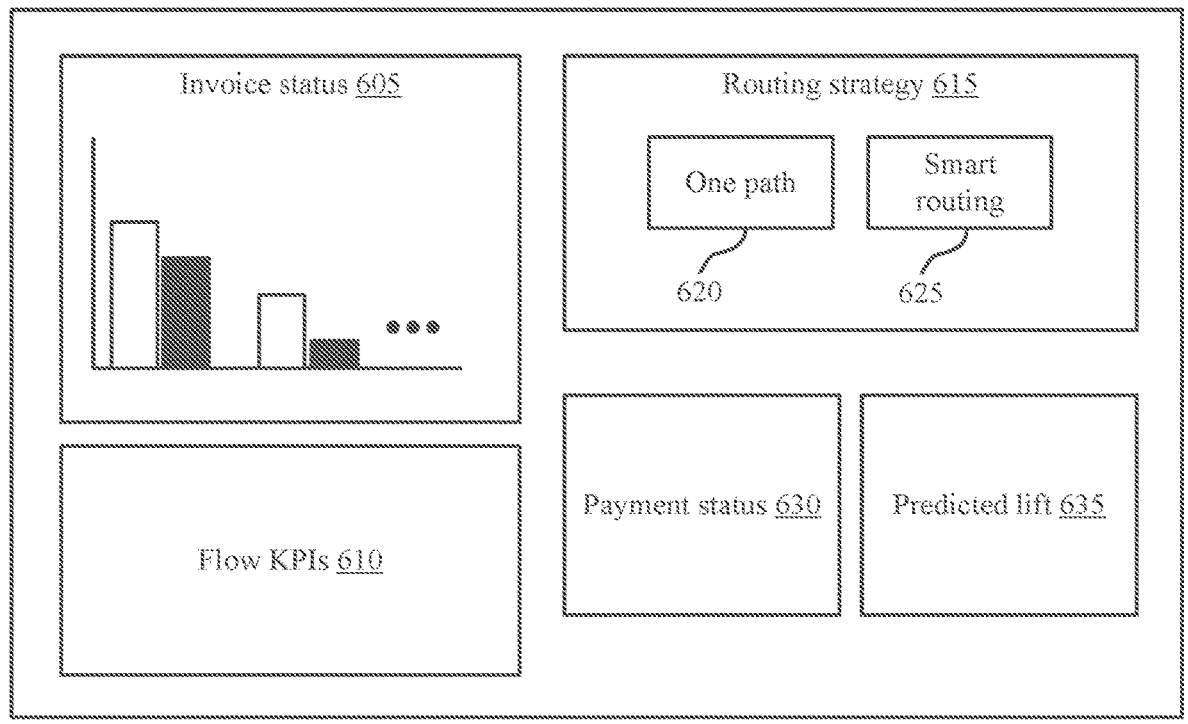
FIG. 6 illustrates an example of a user interface that supports intelligent routing of data objects between paths using machine learning in accordance with aspects of the present disclosure.

FIG. 6 illustrates an example of a user interface 600 that supports intelligent routing of data objects between paths using machine learning in accordance with aspects of the present disclosure. The user interface 600 may implement or be implemented by aspects of the data processing system 100, the computing architecture 200, the routing procedure 300, the routing procedure 400, the routing procedure 500, or any combination thereof. For example, the user interface 600 may be implemented by a user device accessing a database system (e.g., a multi-tenant database system), where the database system supports intelligent routing using a model within a process flow. The user interface 600 may be an example of a dashboard used during A/B testing, model training, intelligent routing, or any combination thereof. The user interface 600 may be a component of a user device, and the user interface 600 may receive data for display from the user device or over a network (e.g., from a cloud-based platform or other application). The user device may communicate using the network, for example, by sending user inputs received at the user interface 600 to a system over the network.

In the example of FIG. 6, a user may use the user interface 600 to identify gain information associated with adding additional portions, variants, actions, paths of actions, or a combination thereof to a process flow. For example, the user may use the user interface 600 to determine an optimal process—or an otherwise improved process—for processing an invoice. The user interface 600 may include an invoice status 605, which may indicate the current status of an invoice. For example, the invoice status 605 may indicate whether an invoice is paid on time, late, or if the status of the invoice is unknown or outstanding. In addition, the user interface 600 may indicate flow KPIs 610. For example, a user of the database system may define the flow KPIs 610 as a metric on which to measure the efficiency or performance of a process flow. The flow KPIs may include a time to perform a process flow, an accuracy metric, or other metrics the intelligent routing system may use to select at least a portion of a process flow or a variant of the process flow for implementation. That is, the KPIs may be user-defined or system-defined metrics for measuring which processes or process flows to use. For example, different models may have different KPI values based on how the models intelligently route data objects to different paths.

Additionally or alternatively, the user interface 600 may indicate a routing strategy 615, which may indicate different process flow options a user may select. The routing strategy 615 may indicate an option to use one path 620 or to use smart routing 625. In some examples, if the one path 620 is selected, all data objects, users, or both may be routed down a single, optimized path for the specific process (e.g., a single process for handling invoices). If the smart routing 625 is selected, data objects, users, or both may be routed down different paths based on one or more parameters (e.g., specific invoices may be handled differently in the process flow based on aspects of the invoices). In some examples, the smart routing 625 may increase the flow KPIs 610 by a higher percentage than the one path 620.

In some cases, the user interface 600 may include a payment status 630, which may indicate how many invoices may be paid on time or late given the current process flow. If more invoices are being paid late than on time, a user may consider using the intelligent routing techniques described herein to improve the process flow (e.g., using the smart routing 625) to increase the number of invoices being paid on time. Additionally or alternatively, the user interface 600 may include a predicted lift 635, which may indicate a prediction for how the payment status 630 may change over a period of time if a specific model is implemented in the process flow. As such, the user interface 600 may provide real-time indications of the efficiency and effectiveness of a process flow such that a user may make changes (e.g., add a new process flow, add new variants, actions, or paths, apply intelligent routing, update a model for intelligent routing) to the process flow to further improve the efficiency and effectiveness of processes in the database system. A user operating the user device including the user interface 600 may use the user interface 600 to analyze results of model training and select a model to install at a decision point between paths in a process flow.

Figure 7:
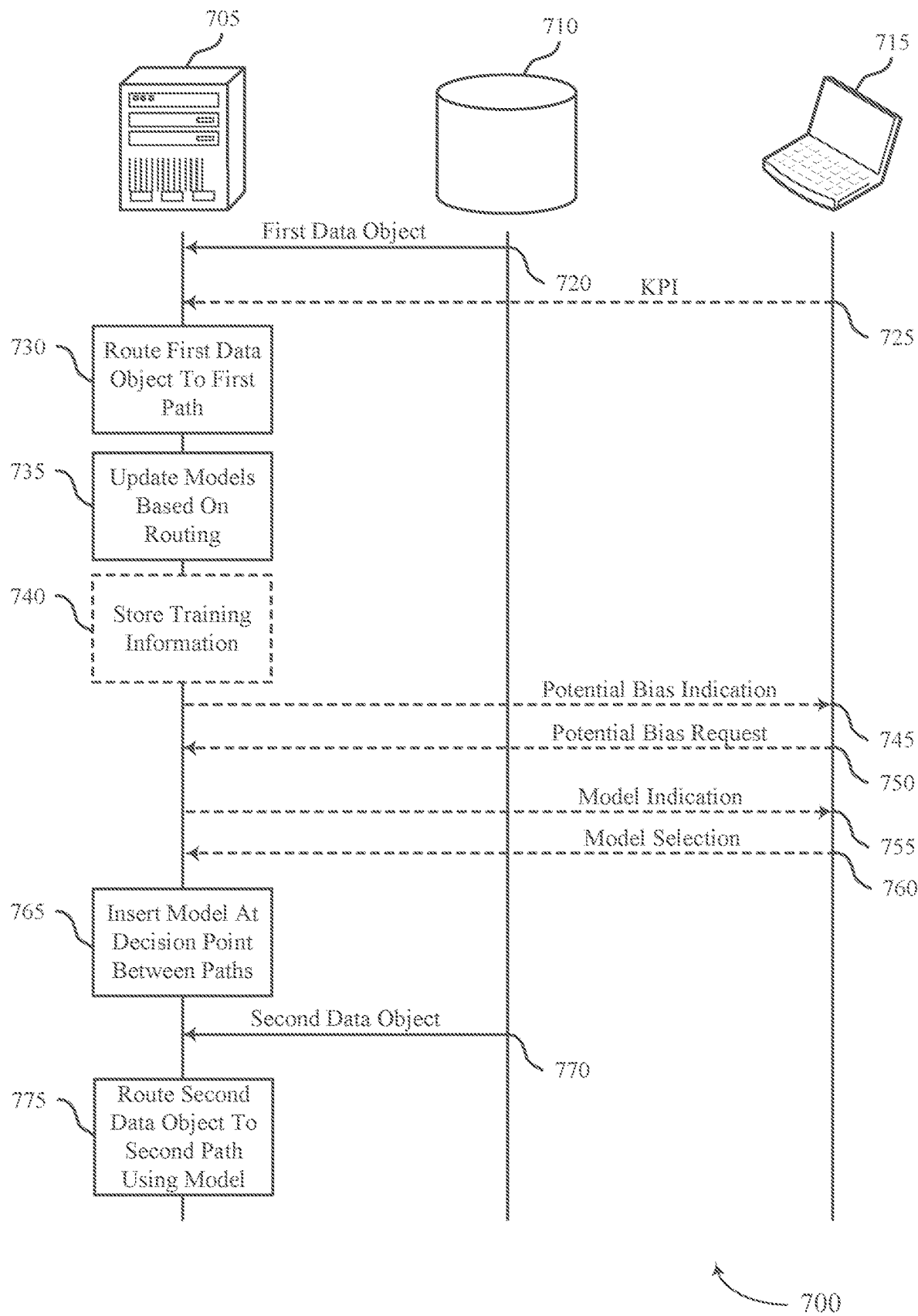
FIG. 7 illustrates an example of a process flow that supports intelligent routing of data objects between paths using machine learning in accordance with aspects of the present disclosure.

FIG. 7 illustrates an example of a process flow 700 that supports intelligent routing of data objects between paths using machine learning in accordance with aspects of the present disclosure. The process flow 700 may implement or be implemented by aspects of the data processing system 100 and the computing architecture 200. For example, the process flow 700 may include an intelligent routing system 705, a database system 710, and a user device 715, which may be examples of corresponding services and platforms described with reference to FIGS. 1 and 2. In some examples, the intelligent routing system 705 may be an example of a component of the database system 710. In the following description of the process flow 700, operations between the intelligent routing system 705, the database system 710, and the user device 715 may be performed in a different order or at a different time than as shown. Additionally or alternatively, some operations may be omitted from the process flow 700, and other operations may be added to the process flow 700.

At 720, a database system 710 may send a data object, which may be a first data object, with one or more features to an intelligent routing system 705. The features may be associated with a process flow. In some cases, the first data object may be from a multi-tenant database system and may include one or more data field values according to a data object schema of the multi-tenant database system. In some examples, the intelligent routing system 705 may transform the data field values into features. For example, the intelligent routing system 705 may generate a numerical value for a non-numerical value of the data field values based on a transmogrify procedure.

At 725, the intelligent routing system 705 may receive an indication of a KPI for the process flow from a user device 715. For example, the user-defined KPI may indicate a metric by which to compare intelligent routing models (e.g., a reliability metric, a performance metric, a latency metric). In some cases, the intelligent routing system 705 may assign one or more KPIs (e.g., if the user does not provide one or more KPIs, or in addition to the user-defined KPIs).

At 730, the intelligent routing system 705 may route the data object to a path of the process flow using a random routing procedure. This random routing may occur during a training phase for the intelligent routing (e.g., an initial training phase before installing a model or a retraining phase). In some cases, the routing may include performing one or more operations for the path using the features of the data object. In some examples, the outcome of performing the operations using the features of the data object may be based on the KPI. That is, the data object may be sent down the selected path and processed by the operations involved in the selected path, resulting in an outcome that may be associated with the defined KPI.

At 735, the intelligent routing system 705 may update multiple models, such as machine learning models, algorithms, heuristics, or the like, based on an outcome of performing the operations. In some cases, the intelligent routing system 705 may update the models based on transforming the data values into features. The intelligent routing system 705 may train the models using at least one feature of the first data object, the outcome of performing the operations using the features of the first data object, and the path to which the first data object is routed, where the trained model predicts a path based on one or more features of a data object.

At 740, the intelligent routing system 705 may store training information including the features of the data object, an indication of the path to which the data objected is routed, and the outcome of performing the operations. The intelligent routing system 705 may update the models based on the training information.

At 745, the intelligent routing system 705 may detect a potential bias in the random routing procedure of at least one feature towards at least one path for the process flow. The detection may be based on the training information. The intelligent routing system 705 may transmit an indication of the potential bias to the user device 715. For example, the intelligent routing system 705 may determine that a percentage of data objects including the at least one feature and routed to the at least one path is greater than a threshold percentage (e.g., if analyzing two paths and over 70% of data objects with a specific feature are routed to one of the paths), where the potential bias is detected based on the determining.

At 750, the intelligent routing system 705 may receive a potential bias request from the user device 715. In some cases, the request may be to ignore the potential bias. In some other cases, the request may be to address the potential bias (e.g., by retraining the affected model).

At 755, the intelligent routing system 705 may transmit an indication of the model to the user device 715 based on a performance metric of the model, such as a KPI of the model. At 760, the intelligent routing system 705 may receive a user selection of the model in response to the indication of the model.

At 765, the intelligent routing system 705 may insert a model into the process flow at a decision point between the paths. In some cases, the intelligent routing system 705 may insert the model into the process flow based on the user selection of the model. In some cases, the intelligent routing system 705 may insert the model into the process flow based on the request to ignore the potential bias. In some cases, the intelligent routing system 705 may remove the model from the decision point between the paths based on the request to address the potential bias.

At 770, the intelligent routing system 705 may receive a second data object with features that may be associated with the process flow. At 775, the intelligent routing system 705 may route the second data object to another path for the process flow using the model inserted at the decision point and the one or more features of the second data object.

In some examples, the intelligent routing system 705 may receive multiple data objects for the process flow. The intelligent routing system 705 may route a subset of the data objects using the model inserted at the decision point and another subset using the random routing procedure, where the subsets are determined according to a random selection procedure. The intelligent routing system 705 may retrain one or more models based on routing the subsets.

In some cases, the intelligent routing system 705 may receive a first set of data objects for the process flow during a first time window and may route the first set of data objects using the model inserted at the decision point. The intelligent routing system 705 may receive a second set of data objects for the process flow during a second time window and may route the second set of data object using the random routing procedure. The intelligent routing system 705 may retrain one or more models based on routing the second set of data objects, routing the first set of data objects, or both.

In some examples, the intelligent routing system 705 may determine one or more KPIs for the process flow and may trigger retraining of the one or more models based on the KPIs failing to satisfy a performance threshold.

The intelligent routing system 705 may determine an update to the process flow and may deactivate the model inserted at the decision point in response to the update to the process flow. The intelligent routing system 705 may reactivate the random routing procedure for the process flow in response to the update to the process flow and retrain one or more models. The update to the process flow may include a new path for the process flow, a new operation for a path of the process flow, a new KPI for the process flow, a new feature of a data object associated with the process flow, or a combination thereof.

In some cases, the intelligent routing system 705 may determine the model based on respective Qini curves corresponding to the set of models, respective Qini coefficients corresponding to the set of models, or a combination thereof, where the model is inserted into the process flow based on the determining.

Figure 8:
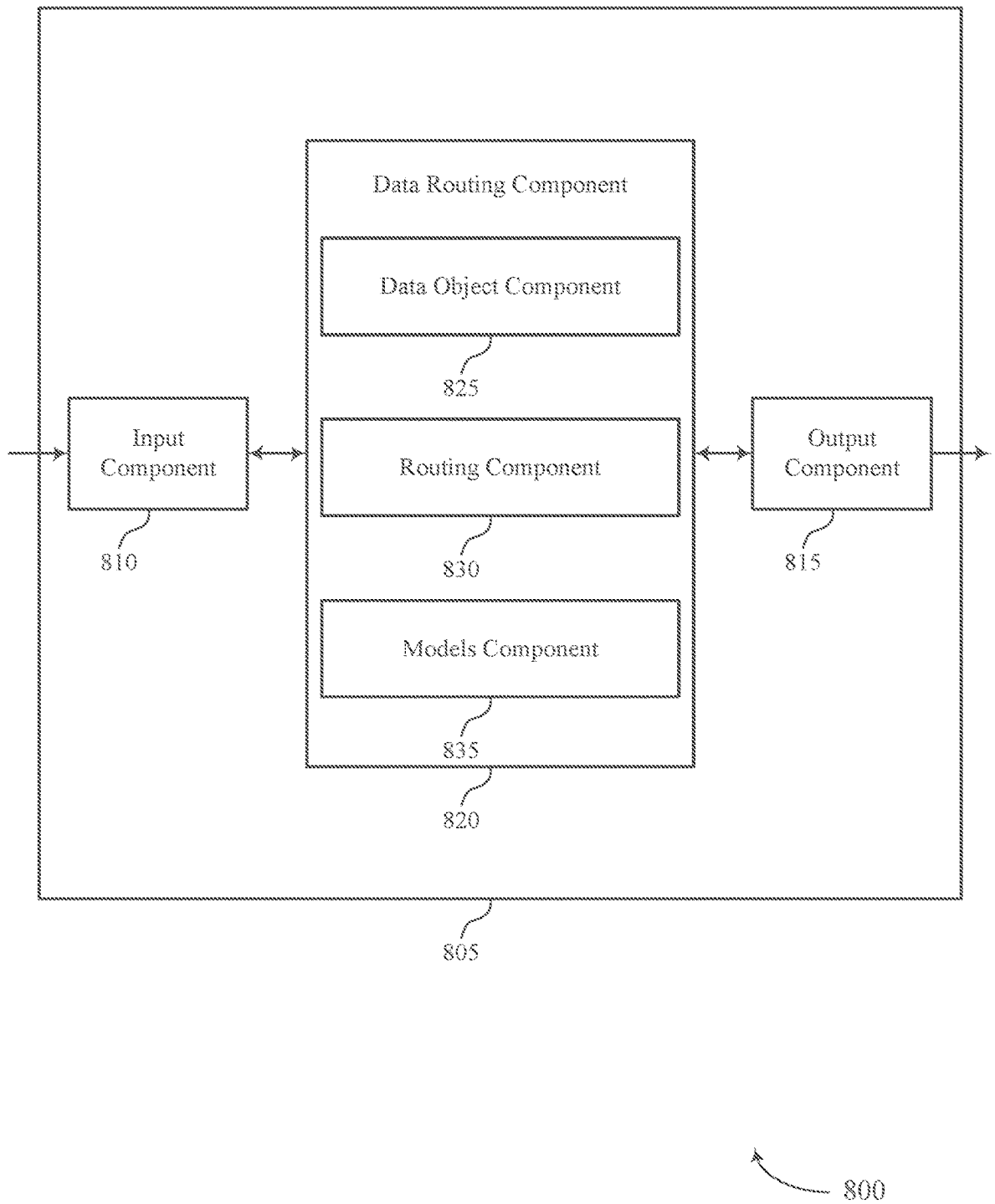
FIG. 8 shows a block diagram of an apparatus that supports intelligent routing of data objects between paths using machine learning in accordance with aspects of the present disclosure.

FIG. 8 shows a block diagram 800 of a device 805 that supports intelligent routing of data objects between paths using machine learning in accordance with aspects of the present disclosure. The device 805 may include an input component 810, an output component 815, and a data routing component 820. The device 805 may also include a processor. Each of these components may be in communication with one another (e.g., via one or more buses).

The input component 810 may manage input signals for the device 805. For example, the input component 810 may identify input signals based on an interaction with a modem, a keyboard, a mouse, a touchscreen, or a similar device. These input signals may be associated with user input or processing at other components or devices. In some cases, the input component 810 may utilize an operating system such as iOS®, ANDROID®, MS-DOS®, MS-WINDOWS®, OS/2®, UNIX®, LINUX®, or another known operating system to handle input signals. The input component 810 may send aspects of these input signals to other components of the device 805 for processing. For example, the input component 810 may transmit input signals to the data routing component 820 to support intelligent routing of data objects between paths using machine learning. In some cases, the input component 810 may be a component of an input/output (I/O) controller 1010 as described with reference to FIG. 10.

The output component 815 may manage output signals for the device 805. For example, the output component 815 may receive signals from other components of the device 805, such as the data routing component 820, and may transmit these signals to other components or devices. In some examples, the output component 815 may transmit output signals for display in a user interface, for storage in a database or data store, for further processing at a server or server cluster, or for any other processes at any number of devices or systems. In some cases, the output component 815 may be a component of an I/O controller 1010 as described with reference to FIG. 10.

For example, the data routing component 820 may include a data object component 825, a routing component 830, a models component 835, or any combination thereof. In some examples, the data routing component 820, or various components thereof, may be configured to perform various operations (e.g., receiving, monitoring, transmitting) using or otherwise in cooperation with the input component 810, the output component 815, or both. For example, the data routing component 820 may receive information from the input component 810, send information to the output component 815, or be integrated in combination with the input component 810, the output component 815, or both to receive information, transmit information, or perform various other operations as described herein.

The data routing component 820 may support determining intelligent routing in accordance with examples as disclosed herein. The data object component 825 may be configured as or otherwise support a means for receiving a first data object comprising one or more first features associated with a process flow. The routing component 830 may be configured as or otherwise support a means for routing the first data object to a first path of a plurality of paths of the process flow using a random routing procedure, the routing comprising performing one or more operations associated with the first path using the one or more first features of the first data object. The models component 835 may be configured as or otherwise support a means for updating a plurality of models based at least in part on an outcome of performing the one or more operations using the one or more first features of the first data object. The models component 835 may be configured as or otherwise support a means for inserting a model of the plurality of models into the process flow at a decision point between the plurality of paths. The data object component 825 may be configured as or otherwise support a means for receiving a second data object comprising one or more second features associated with the process flow. The routing component 830 may be configured as or otherwise support a means for routing the second data object to a second path of the plurality of paths for the process flow using the model inserted at the decision point and the one or more second features of the second data object.

Figure 9:
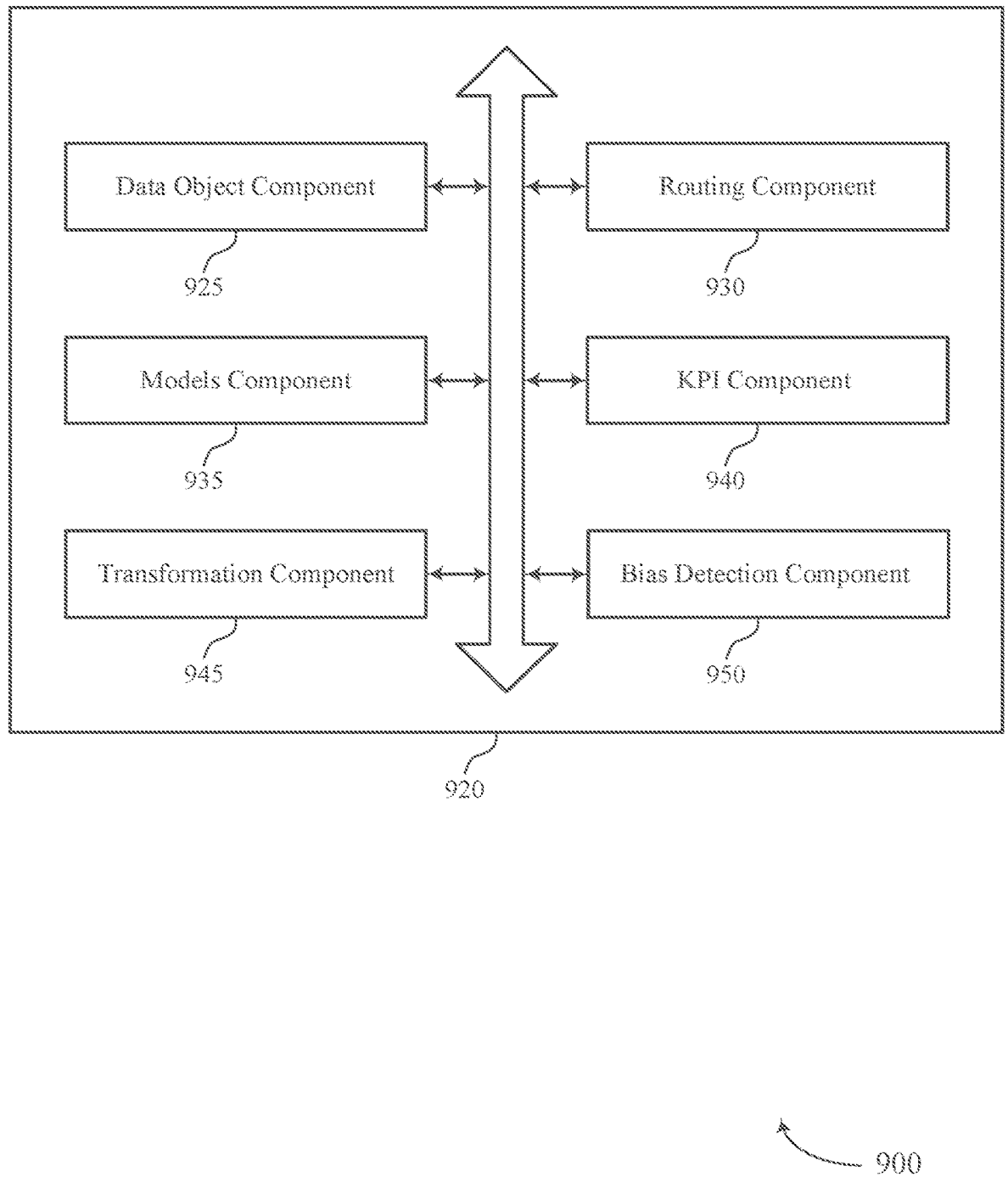
FIG. 9 shows a block diagram of a data routing component that supports intelligent routing of data objects between paths using machine learning in accordance with aspects of the present disclosure.

FIG. 9 shows a block diagram 900 of a data routing component 920 that supports intelligent routing of data objects between paths using machine learning in accordance with aspects of the present disclosure. The data routing component 920 may be an example of aspects of a data routing component 820, as described herein. The data routing component 920, or various components thereof, may be an example of means for performing various aspects of intelligent routing of data objects between paths using machine learning as described herein. For example, the data routing component 920 may include a data object component 925, a routing component 930, a models component 935, a KPI component 940, a transformation component 945, a bias detection component 950, or any combination thereof. Each of these components may communicate, directly or indirectly, with one another (e.g., via one or more buses).

The data routing component 920 may support determining intelligent routing in accordance with examples as disclosed herein. The data object component 925 may be configured as or otherwise support a means for receiving a first data object comprising one or more first features associated with a process flow. The routing component 930 may be configured as or otherwise support a means for routing the first data object to a first path of a plurality of paths of the process flow using a random routing procedure, the routing comprising performing one or more operations associated with the first path using the one or more first features of the first data object. The models component 935 may be configured as or otherwise support a means for updating a plurality of models based at least in part on an outcome of performing the one or more operations using the one or more first features of the first data object. In some examples, the models component 935 may be configured as or otherwise support a means for inserting a model of the plurality of models into the process flow at a decision point between the plurality of paths. In some examples, the data object component 925 may be configured as or otherwise support a means for receiving a second data object comprising one or more second features associated with the process flow. In some examples, the routing component 930 may be configured as or otherwise support a means for routing the second data object to a second path of the plurality of paths for the process flow using the model inserted at the decision point and the one or more second features of the second data object.

In some examples, the KPI component 940 may be configured as or otherwise support a means for receiving, from a user device and based at least in part on a user input, an indication of a KPI for the process flow, wherein the outcome of performing the one or more operations using the one or more first features of the first data object is based at least in part on the KPI.

In some examples, the models component 935 may be configured as or otherwise support a means for transmitting, to a user device, an indication of the model based at least in part on a performance metric of the model. In some examples, the models component 935 may be configured as or otherwise support a means for receiving, from the user device and in response to the indication of the model, a user selection of the model, wherein the model is inserted into the process flow based at least in part on the user selection of the model.

In some examples, the first data object is received from a database system and comprises one or more data field values according to a data object schema of the database system, and the transformation component 945 may be configured as or otherwise support a means for transforming the one or more data field values of the first data object into the one or more first features associated with the process flow, wherein updating the plurality of models is based at least in part on the transforming.

In some examples, to support transforming, the transformation component 945 may be configured as or otherwise support a means for generating, for a non-numerical value of the one or more data field values, a numerical value based at least in part on a transmogrify procedure, the one or more first features comprising the numerical value.

In some examples, the data object component 925 may be configured as or otherwise support a means for storing training information comprising the one or more first features of the first data object, an indication of the first path to which the first data object is routed, and the outcome of performing the one or more operations using the one or more first features of the first data object, wherein updating the plurality of models is based at least in part on the training information.

In some examples, the bias detection component 950 may be configured as or otherwise support a means for detecting, based at least in part on the training information, a potential bias in the random routing procedure of at least one feature of the one or more first features towards at least one path of the plurality of paths for the process flow. In some examples, the bias detection component 950 may be configured as or otherwise support a means for transmitting, to a user device, an indication of the potential bias in the random routing procedure.

In some examples, the bias detection component 950 may be configured as or otherwise support a means for receiving, from the user device and in response to the indication of the potential bias, a request to ignore the potential bias, wherein the model is inserted into the process flow based at least in part on the request to ignore the potential bias.

In some examples, the bias detection component 950 may be configured as or otherwise support a means for receiving, from the user device and in response to the indication of the potential bias, a request to address the potential bias. In some examples, the models component 935 may be configured as or otherwise support a means for removing the model from the decision point between the plurality of paths based at least in part on the request to address the potential bias.

In some examples, the bias detection component 950 may be configured as or otherwise support a means for determining that a percentage of data objects comprising the at least one feature and routed to the at least one path is greater than a threshold percentage, wherein the potential bias is detected based at least in part on the determining.

In some examples, to support updating the plurality of models, the models component 935 may be configured as or otherwise support a means for training the model using at least one of the one or more first features of the first data object, the outcome of performing the one or more operations using the one or more first features of the first data object, and the first path to which the first data object is routed, wherein the trained model predicts, based at least in part on one or more features of a data object, a path of the plurality of paths to route the data object to achieve an outcome.

In some examples, the data object component 925 may be configured as or otherwise support a means for receiving a plurality of data objects for the process flow. In some examples, the routing component 930 may be configured as or otherwise support a means for routing a first subset of the plurality of data objects using the model inserted at the decision point. In some examples, the routing component 930 may be configured as or otherwise support a means for routing a second subset of the plurality of data objects using the random routing procedure, wherein the first subset and the second subset are determined according to a random selection procedure. In some examples, the models component 935 may be configured as or otherwise support a means for retraining one or more models of the plurality of models based at least in part on routing the second subset, routing the first subset, or both.

In some examples, the data object component 925 may be configured as or otherwise support a means for receiving a first plurality of data objects for the process flow during a first time window. In some examples, the routing component 930 may be configured as or otherwise support a means for routing the first plurality of data objects using the model inserted at the decision point based at least in part on receiving the first plurality of data objects during the first time window. In some examples, the data object component 925 may be configured as or otherwise support a means for receiving a second plurality of data objects for the process flow during a second time window. In some examples, the routing component 930 may be configured as or otherwise support a means for routing the second plurality of data objects using the random routing procedure based at least in part on receiving the second plurality of data objects during the second time window. In some examples, the models component 935 may be configured as or otherwise support a means for retraining one or more models of the plurality of models based at least in part on routing the second plurality of data objects, routing the first plurality of data objects, or both.

In some examples, the KPI component 940 may be configured as or otherwise support a means for determining one or more KPIs for the process flow based at least in part on routing a plurality of data objects using the model inserted at the decision point. In some examples, the KPI component 940 may be configured as or otherwise support a means for triggering retraining of one or more models of the plurality of models based at least in part on the one or more KPIs failing to satisfy a performance threshold.

In some examples, the models component 935 may be configured as or otherwise support a means for determining an update to the process flow. In some examples, the models component 935 may be configured as or otherwise support a means for deactivating the model inserted at the decision point of the process flow in response to the update to the process flow. In some examples, the routing component 930 may be configured as or otherwise support a means for reactivating the random routing procedure for the process flow in response to the update to the process flow. In some examples, the models component 935 may be configured as or otherwise support a means for retraining one or more models of the plurality of models based at least in part on reactivating the random routing procedure for the process flow. In some examples, the update to the process flow comprises a new path for the process flow, a new operation for a path of the process flow, a new KPI for the process flow, a new feature of a data object associated with the process flow, or a combination thereof.

In some examples, the models component 935 may be configured as or otherwise support a means for determining the model from the plurality of models based at least in part on respective Qini curves corresponding to the plurality of models, respective Qini coefficients corresponding to the plurality of models, or a combination thereof, wherein the model is inserted into the process flow based at least in part on the determining.

Figure 10:
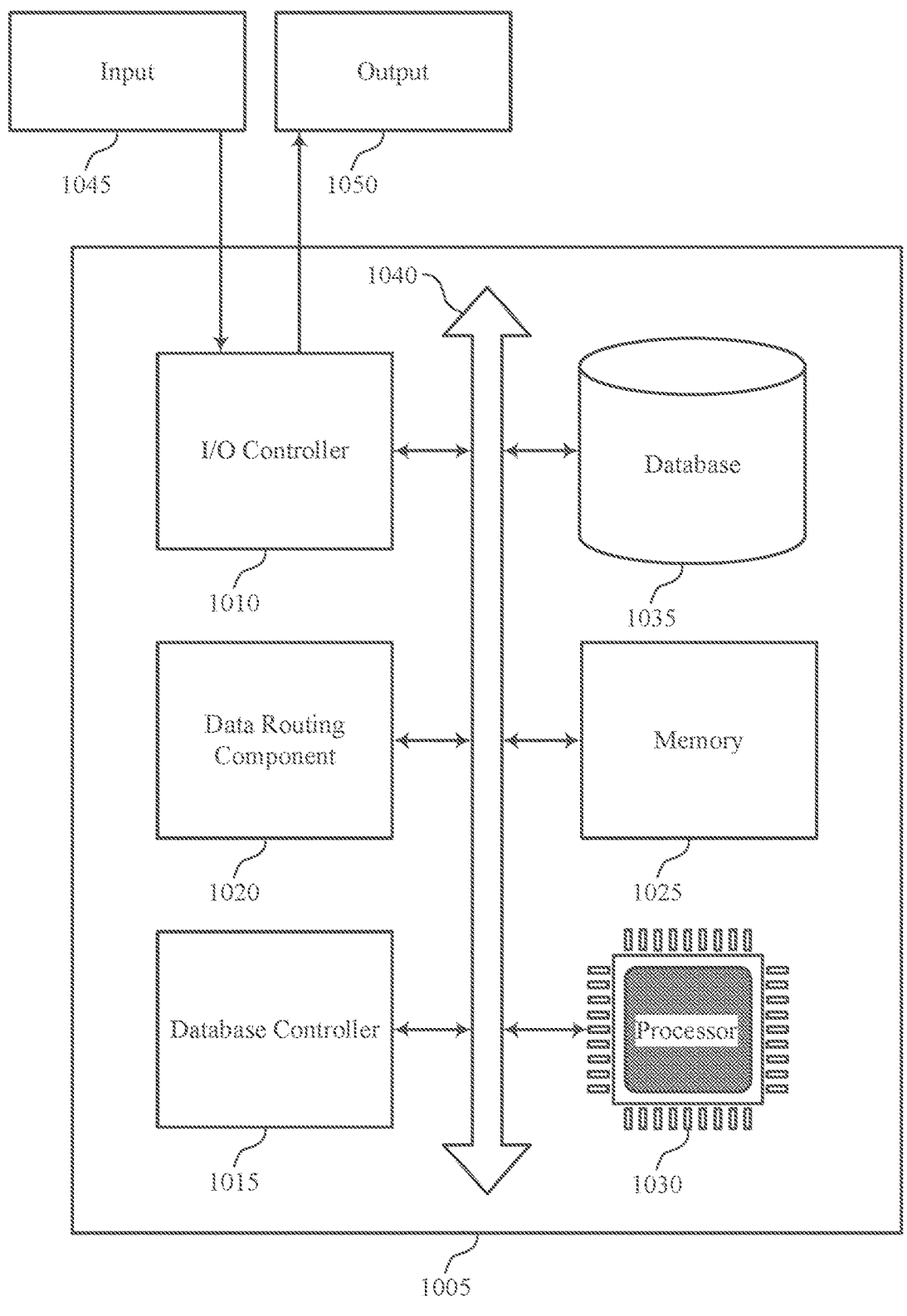
FIG. 10 shows a diagram of a system including a device that supports intelligent routing of data objects between paths using machine learning in accordance with aspects of the present disclosure.

FIG. 10 shows a diagram of a system 1000 including a device 1005 that supports intelligent routing of data objects between paths using machine learning in accordance with aspects of the present disclosure. The device 1005 may be an example of or include the components of a device 805 as described herein. The device 1005 may include components for bi-directional data communications including components for transmitting and receiving communications, such as a data routing component 1020, an I/O controller 1010, a database controller 1015, a memory 1025, a processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor 1030. In some examples, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor 1030 to perform various functions described herein. In some cases, the memory 1025 may contain, among other things, a basic I/O system (BIOS) which may control basic hardware or software operation such as the interaction with peripheral components or devices.

The processor 1030 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting intelligent routing of data objects between paths using machine learning).

The data routing component 1020 may support determining intelligent routing in accordance with examples as disclosed herein. For example, the data routing component 1020 may be configured as or otherwise support a means for receiving a first data object comprising one or more first features associated with a process flow. The data routing component 1020 may be configured as or otherwise support a means for routing the first data object to a first path of a plurality of paths of the process flow using a random routing procedure, the routing comprising performing one or more operations associated with the first path using the one or more first features of the first data object. The data routing component 1020 may be configured as or otherwise support a means for updating a plurality of models based at least in part on an outcome of performing the one or more operations using the one or more first features of the first data object. The data routing component 1020 may be configured as or otherwise support a means for inserting a model of the plurality of models into the process flow at a decision point between the plurality of paths. The data routing component 1020 may be configured as or otherwise support a means for receiving a second data object comprising one or more second features associated with the process flow. The data routing component 1020 may be configured as or otherwise support a means for routing the second data object to a second path of the plurality of paths for the process flow using the model inserted at the decision point and the one or more second features of the second data object.

By including or configuring the data routing component 1020 in accordance with examples as described herein, the device 1005 may support techniques for an intelligent routing system to use a model for dynamically routing data objects through a process flow based on one or more aspects of the data objects, which may improve processing efficiency among other benefits.

Figure 11:
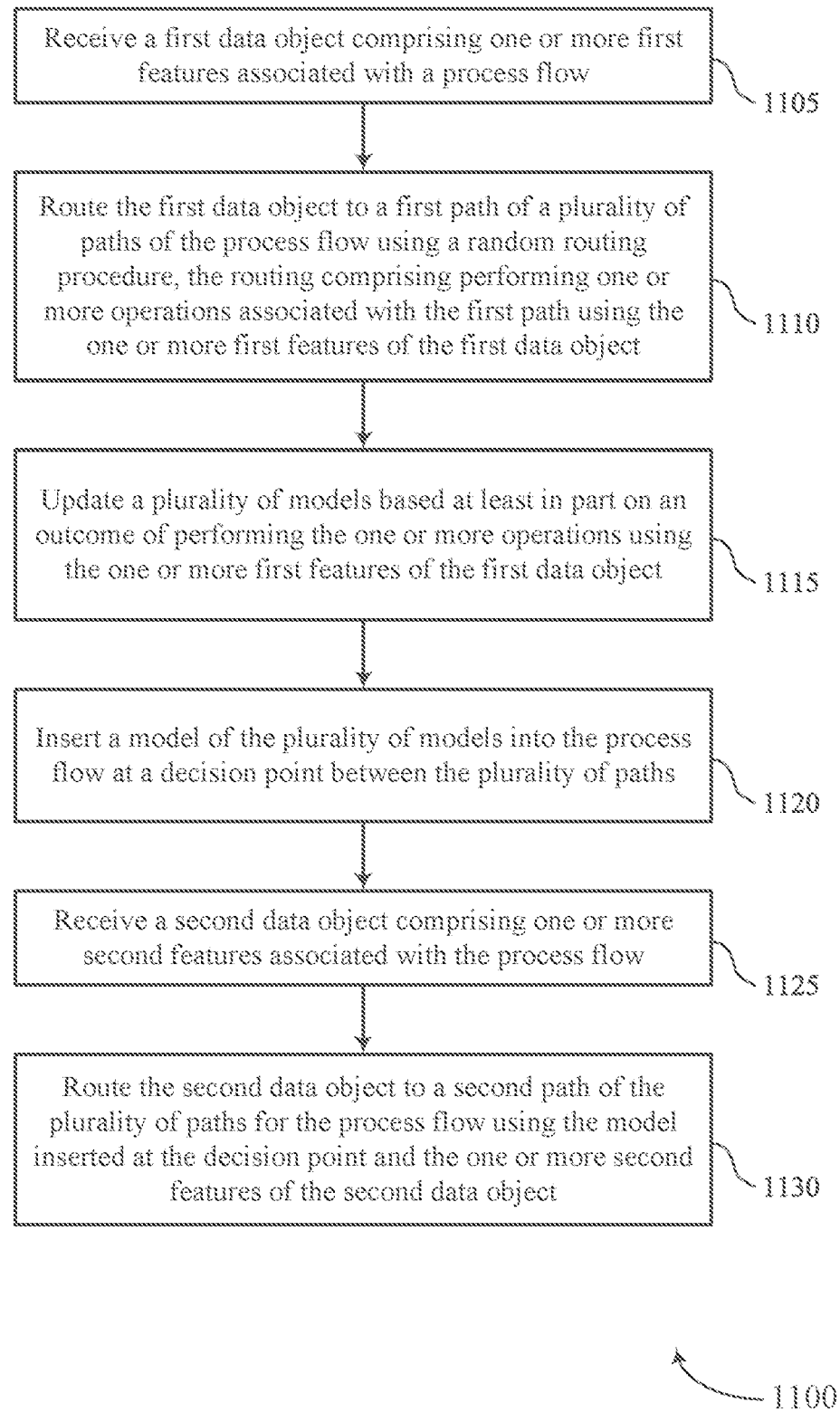
FIGS. 11 through 13 show flowcharts illustrating methods that support intelligent routing of data objects between paths using machine learning in accordance with aspects of the present disclosure.

FIG. 11 shows a flowchart illustrating a method 1100 that supports intelligent routing of data objects between paths using machine learning in accordance with aspects of the present disclosure. The operations of the method 1100 may be implemented by an intelligent routing system (e.g., using an application server, a cloud-based server, a database server, a worker, a server cluster, a virtual machine, a container, or any other device or system configured for data processing) or its components as described herein. For example, the operations of the method 1100 may be performed by an intelligent routing system as described with reference to FIGS. 1 through 10. In some examples, an intelligent routing system may execute a set of instructions to control the functional elements of the intelligent routing system to perform the described functions. Additionally or alternatively, the intelligent routing system may perform aspects of the described functions using special-purpose hardware.

At 1105, the method may include receiving a first data object comprising one or more first features associated with a process flow. The operations of 1105 may be performed in accordance with examples as disclosed herein. In some examples, aspects of the operations of 1105 may be performed by a data object component 925 as described with reference to FIG. 9.

At 1110, the method may include routing the first data object to a first path of a plurality of paths of the process flow using a random routing procedure, the routing comprising performing one or more operations associated with the first path using the one or more first features of the first data object. The operations of 1110 may be performed in accordance with examples as disclosed herein. In some examples, aspects of the operations of 1110 may be performed by a routing component 930 as described with reference to FIG. 9.

At 1115, the method may include updating a plurality of models based at least in part on an outcome of performing the one or more operations using the one or more first features of the first data object. The operations of 1115 may be performed in accordance with examples as disclosed herein. In some examples, aspects of the operations of 1115 may be performed by a models component 935 as described with reference to FIG. 9.

At 1120, the method may include inserting a model of the plurality of models into the process flow at a decision point between the plurality of paths. The operations of 1120 may be performed in accordance with examples as disclosed herein. In some examples, aspects of the operations of 1120 may be performed by a models component 935 as described with reference to FIG. 9.

At 1125, the method may include receiving a second data object comprising one or more second features associated with the process flow. The operations of 1125 may be performed in accordance with examples as disclosed herein. In some examples, aspects of the operations of 1125 may be performed by a data object component 925 as described with reference to FIG. 9.

At 1130, the method may include routing the second data object to a second path of the plurality of paths for the process flow using the model inserted at the decision point and the one or more second features of the second data object. The operations of 1130 may be performed in accordance with examples as disclosed herein. In some examples, aspects of the operations of 1130 may be performed by a routing component 930 as described with reference to FIG. 9.

Figure 12:
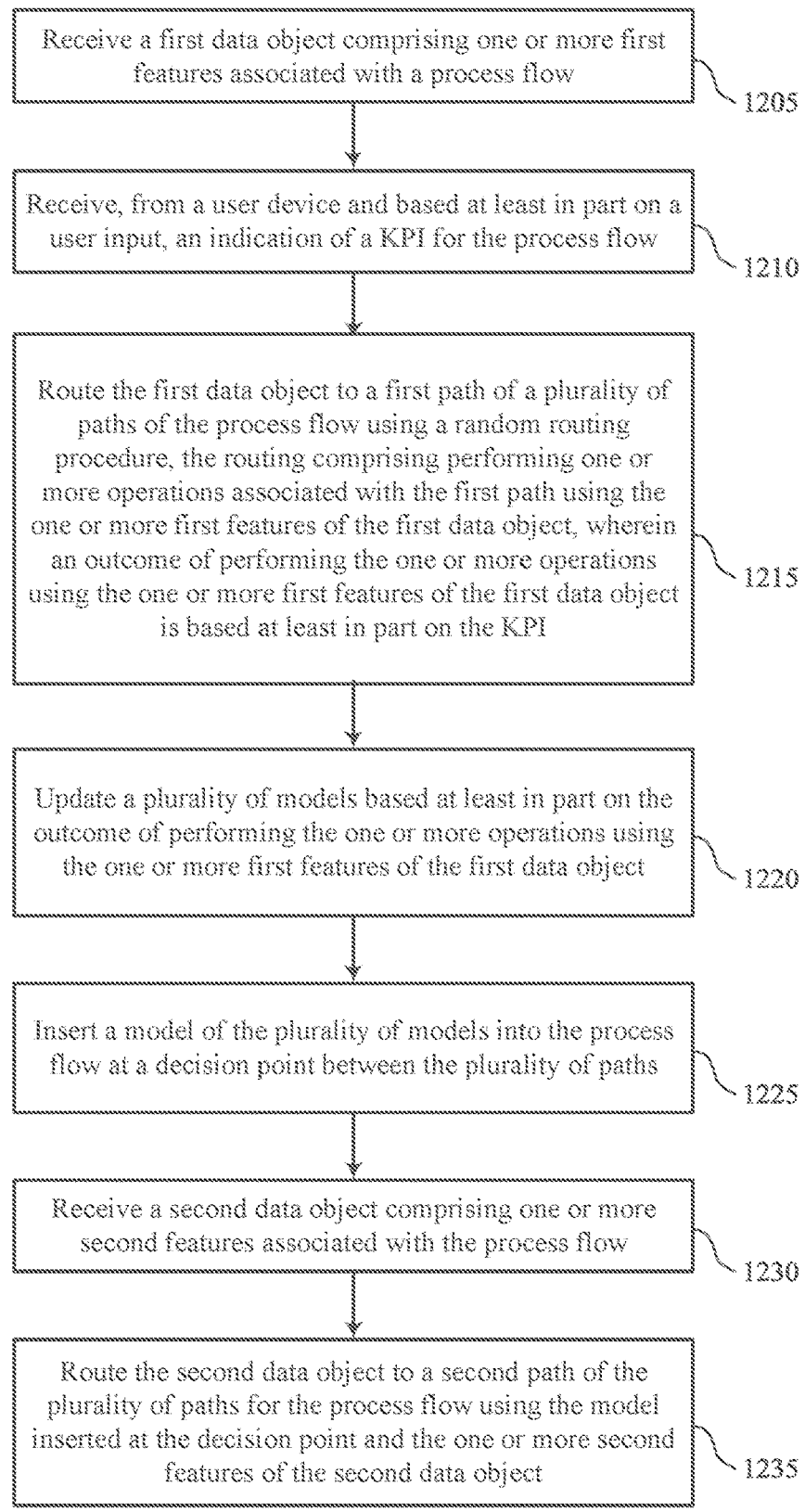

FIG. 12 shows a flowchart illustrating a method 1200 that supports intelligent routing of data objects between paths using machine learning in accordance with aspects of the present disclosure. The operations of the method 1200 may be implemented by an intelligent routing system (e.g., using an application server, a cloud-based server, a database server, a worker, a server cluster, a virtual machine, a container, or any other device or system configured for data processing) or its components as described herein. For example, the operations of the method 1200 may be performed by an intelligent routing system as described with reference to FIGS. 1 through 10. In some examples, an intelligent routing system may execute a set of instructions to control the functional elements of the intelligent routing system to perform the described functions. Additionally or alternatively, the intelligent routing system may perform aspects of the described functions using special-purpose hardware.

At 1205, the method may include receiving a first data object comprising one or more first features associated with a process flow. The operations of 1205 may be performed in accordance with examples as disclosed herein. In some examples, aspects of the operations of 1205 may be performed by a data object component 925 as described with reference to FIG. 9.

At 1210, the method may include receiving, from a user device and based at least in part on a user input, an indication of a KPI for the process flow. The operations of 1210 may be performed in accordance with examples as disclosed herein. In some examples, aspects of the operations of 1210 may be performed by a KPI component 940 as described with reference to FIG. 9.

At 1215, the method may include routing the first data object to a first path of a plurality of paths of the process flow using a random routing procedure, the routing comprising performing one or more operations associated with the first path using the one or more first features of the first data object, where an outcome of performing the one or more operations using the one or more first features of the first data object is based at least in part on the KPI. The operations of 1215 may be performed in accordance with examples as disclosed herein. In some examples, aspects of the operations of 1215 may be performed by a routing component 930 as described with reference to FIG. 9.

At 1220, the method may include updating a plurality of models based at least in part on the outcome of performing the one or more operations using the one or more first features of the first data object. The operations of 1220 may be performed in accordance with examples as disclosed herein. In some examples, aspects of the operations of 1220 may be performed by a models component 935 as described with reference to FIG. 9.

At 1225, the method may include inserting a model of the plurality of models into the process flow at a decision point between the plurality of paths. The operations of 1225 may be performed in accordance with examples as disclosed herein. In some examples, aspects of the operations of 1225 may be performed by a models component 935 as described with reference to FIG. 9.

At 1230, the method may include receiving a second data object comprising one or more second features associated with the process flow. The operations of 1230 may be performed in accordance with examples as disclosed herein. In some examples, aspects of the operations of 1230 may be performed by a data object component 925 as described with reference to FIG. 9.

At 1235, the method may include routing the second data object to a second path of the plurality of paths for the process flow using the model inserted at the decision point and the one or more second features of the second data object. The operations of 1235 may be performed in accordance with examples as disclosed herein. In some examples, aspects of the operations of 1235 may be performed by a routing component 930 as described with reference to FIG. 9.

Figure 13:
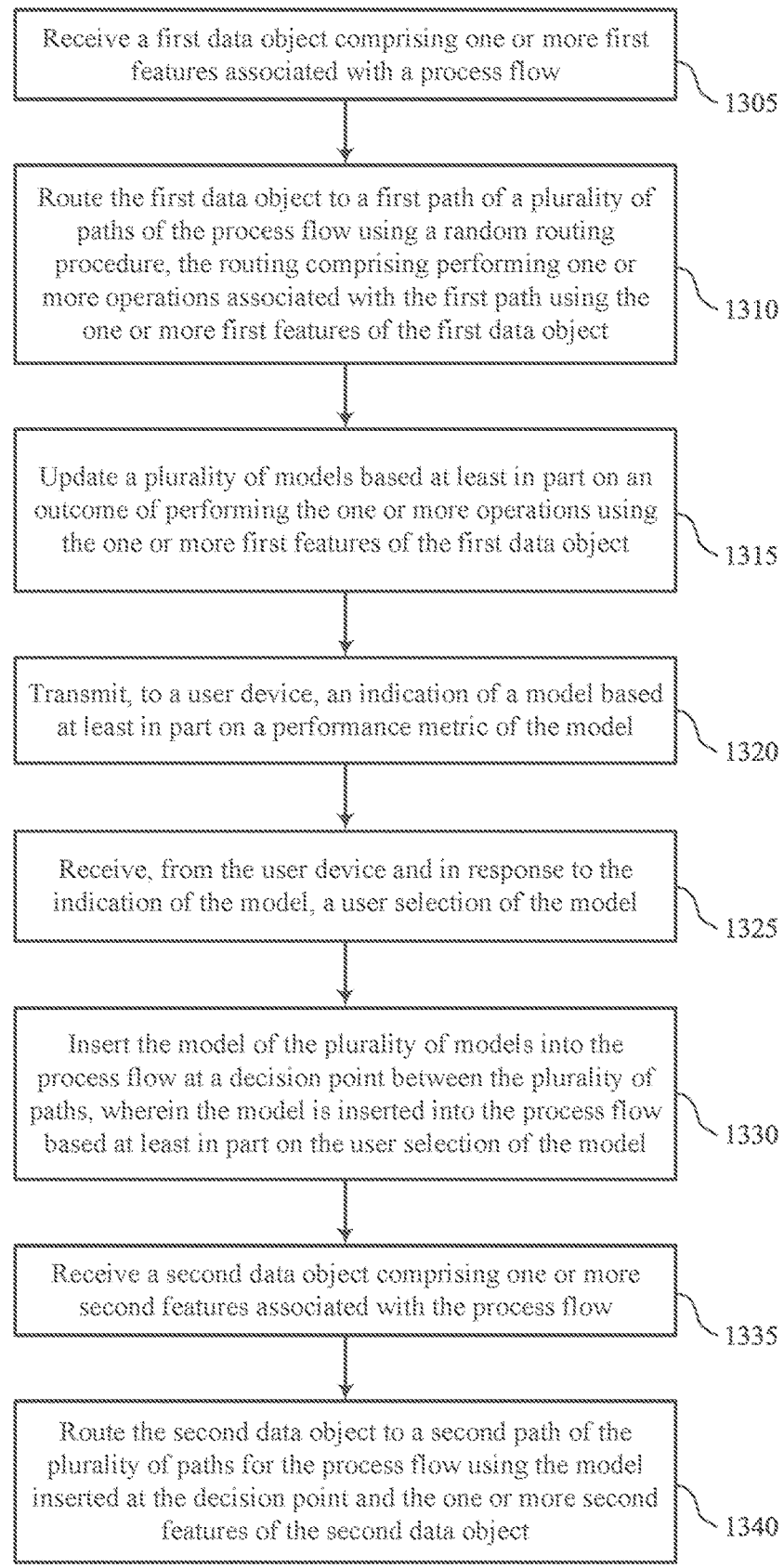

FIG. 13 shows a flowchart illustrating a method 1300 that supports intelligent routing of data objects between paths using machine learning in accordance with aspects of the present disclosure. The operations of the method 1300 may be implemented by an intelligent routing system (e.g., using an application server, a cloud-based server, a database server, a worker, a server cluster, a virtual machine, a container, or any other device or system configured for data processing) or its components as described herein. For example, the operations of the method 1300 may be performed by an intelligent routing system as described with reference to FIGS. 1 through 10. In some examples, an intelligent routing system may execute a set of instructions to control the functional elements of the intelligent routing system to perform the described functions. Additionally or alternatively, the intelligent routing system may perform aspects of the described functions using special-purpose hardware.

At 1305, the method may include receiving a first data object comprising one or more first features associated with a process flow. The operations of 1305 may be performed in accordance with examples as disclosed herein. In some examples, aspects of the operations of 1305 may be performed by a data object component 925 as described with reference to FIG. 9.

At 1310, the method may include routing the first data object to a first path of a plurality of paths of the process flow using a random routing procedure, the routing comprising performing one or more operations associated with the first path using the one or more first features of the first data object. The operations of 1310 may be performed in accordance with examples as disclosed herein. In some examples, aspects of the operations of 1310 may be performed by a routing component 930 as described with reference to FIG. 9.

At 1315, the method may include updating a plurality of models based at least in part on an outcome of performing the one or more operations using the one or more first features of the first data object. The operations of 1315 may be performed in accordance with examples as disclosed herein. In some examples, aspects of the operations of 1315 may be performed by a models component 935 as described with reference to FIG. 9.

At 1320, the method may include transmitting, to a user device, an indication of a model based at least in part on a performance metric of the model. The operations of 1320 may be performed in accordance with examples as disclosed herein. In some examples, aspects of the operations of 1320 may be performed by a models component 935 as described with reference to FIG. 9.

At 1325, the method may include receiving, from the user device and in response to the indication of the model, a user selection of the model. The operations of 1325 may be performed in accordance with examples as disclosed herein. In some examples, aspects of the operations of 1325 may be performed by a models component 935 as described with reference to FIG. 9.

At 1330, the method may include inserting the model of the plurality of models into the process flow at a decision point between the plurality of paths, wherein the model is inserted into the process flow based at least in part on the user selection of the model. The operations of 1330 may be performed in accordance with examples as disclosed herein. In some examples, aspects of the operations of 1330 may be performed by a models component 935 as described with reference to FIG. 9.

At 1335, the method may include receiving a second data object comprising one or more second features associated with the process flow. The operations of 1335 may be performed in accordance with examples as disclosed herein. In some examples, aspects of the operations of 1335 may be performed by a data object component 925 as described with reference to FIG. 9.

At 1340, the method may include routing the second data object to a second path of the plurality of paths for the process flow using the model inserted at the decision point and the one or more second features of the second data object. The operations of 1340 may be performed in accordance with examples as disclosed herein. In some examples, aspects of the operations of 1340 may be performed by a routing component 930 as described with reference to FIG. 9.

A method for determining intelligent routing is described. The method may include receiving a first data object comprising one or more first features associated with a process flow, routing the first data object to a first path of a plurality of paths of the process flow using a random routing procedure, the routing comprising performing one or more operations associated with the first path using the one or more first features of the first data object, updating a plurality of models based at least in part on an outcome of performing the one or more operations using the one or more first features of the first data object, inserting a model of the plurality of models into the process flow at a decision point between the plurality of paths, receiving a second data object comprising one or more second features associated with the process flow, and routing the second data object to a second path of the plurality of paths for the process flow using the model inserted at the decision point and the one or more second features of the second data object.

An apparatus for determining intelligent routing is described. The apparatus may include a processor, memory coupled with the processor, and instructions stored in the memory. The instructions may be executable by the processor to cause the apparatus to receive a first data object comprising one or more first features associated with a process flow, route the first data object to a first path of a plurality of paths of the process flow using a random routing procedure, the routing comprising performing one or more operations associated with the first path using the one or more first features of the first data object, update a plurality of models based at least in part on an outcome of performing the one or more operations using the one or more first features of the first data object, insert a model of the plurality of models into the process flow at a decision point between the plurality of paths, receive a second data object comprising one or more second features associated with the process flow, and route the second data object to a second path of the plurality of paths for the process flow using the model inserted at the decision point and the one or more second features of the second data object.

Another apparatus for determining intelligent routing is described. The apparatus may include means for receiving a first data object comprising one or more first features associated with a process flow, means for routing the first data object to a first path of a plurality of paths of the process flow using a random routing procedure, the routing comprising performing one or more operations associated with the first path using the one or more first features of the first data object, means for updating a plurality of models based at least in part on an outcome of performing the one or more operations using the one or more first features of the first data object, means for inserting a model of the plurality of models into the process flow at a decision point between the plurality of paths, means for receiving a second data object comprising one or more second features associated with the process flow, and means for routing the second data object to a second path of the plurality of paths for the process flow using the model inserted at the decision point and the one or more second features of the second data object.

A non-transitory computer-readable medium storing code for determining intelligent routing is described. The code may include instructions executable by a processor to receive a first data object comprising one or more first features associated with a process flow, route the first data object to a first path of a plurality of paths of the process flow using a random routing procedure, the routing comprising performing one or more operations associated with the first path using the one or more first features of the first data object, update a plurality of models based at least in part on an outcome of performing the one or more operations using the one or more first features of the first data object, insert a model of the plurality of models into the process flow at a decision point between the plurality of paths, receive a second data object comprising one or more second features associated with the process flow, and route the second data object to a second path of the plurality of paths for the process flow using the model inserted at the decision point and the one or more second features of the second data object.

Some examples of the method, apparatuses, and non-transitory computer-readable medium described herein may further include operations, features, means, or instructions for receiving, from a user device and based at least in part on a user input, an indication of a KPI for the process flow, wherein the outcome of performing the one or more operations using the one or more first features of the first data object may be based at least in part on the KPI.

Some examples of the method, apparatuses, and non-transitory computer-readable medium described herein may further include operations, features, means, or instructions for transmitting, to a user device, an indication of the model based at least in part on a performance metric of the model and receiving, from the user device and in response to the indication of the model, a user selection of the model, wherein the model may be inserted into the process flow based at least in part on the user selection of the model.

In some examples of the method, apparatuses, and non-transitory computer-readable medium described herein, the first data object may be received from a database system and comprises one or more data field values according to a data object schema of the database system and the method, apparatuses, and non-transitory computer-readable medium may include further operations, features, means, or instructions for transforming the one or more data field values of the first data object into the one or more first features associated with the process flow, wherein updating the plurality of models may be based at least in part on the transforming.

In some examples of the method, apparatuses, and non-transitory computer-readable medium described herein, the transforming may include operations, features, means, or instructions for generating, for a non-numerical value of the one or more data field values, a numerical value based at least in part on a transmogrify procedure, the one or more first features comprising the numerical value.

Some examples of the method, apparatuses, and non-transitory computer-readable medium described herein may further include operations, features, means, or instructions for storing training information comprising the one or more first features of the first data object, an indication of the first path to which the first data object may be routed, and the outcome of performing the one or more operations using the one or more first features of the first data object, wherein updating the plurality of models may be based at least in part on the training information.

Some examples of the method, apparatuses, and non-transitory computer-readable medium described herein may further include operations, features, means, or instructions for detecting, based at least in part on the training information, a potential bias in the random routing procedure of at least one feature of the one or more first features towards at least one path of the plurality of paths for the process flow and transmitting, to a user device, an indication of the potential bias in the random routing procedure.

Some examples of the method, apparatuses, and non-transitory computer-readable medium described herein may further include operations, features, means, or instructions for receiving, from the user device and in response to the indication of the potential bias, a request to ignore the potential bias, wherein the model may be inserted into the process flow based at least in part on the request to ignore the potential bias.

Some examples of the method, apparatuses, and non-transitory computer-readable medium described herein may further include operations, features, means, or instructions for receiving, from the user device and in response to the indication of the potential bias, a request to address the potential bias and removing the model from the decision point between the plurality of paths based at least in part on the request to address the potential bias.

Some examples of the method, apparatuses, and non-transitory computer-readable medium described herein may further include operations, features, means, or instructions for determining that a percentage of data objects comprising the at least one feature and routed to the at least one path may be greater than a threshold percentage, wherein the potential bias may be detected based at least in part on the determining.

In some examples of the method, apparatuses, and non-transitory computer-readable medium described herein, updating the plurality of models may include operations, features, means, or instructions for training the model using at least one of the one or more first features of the first data object, the outcome of performing the one or more operations using the one or more first features of the first data object, and the first path to which the first data object may be routed, wherein the trained model predicts, based at least in part on one or more features of a data object, a path of the plurality of paths to route the data object to achieve an outcome.

Some examples of the method, apparatuses, and non-transitory computer-readable medium described herein may further include operations, features, means, or instructions for receiving a plurality of data objects for the process flow, routing a first subset of the plurality of data objects using the model inserted at the decision point, routing a second subset of the plurality of data objects using the random routing procedure, wherein the first subset and the second subset may be determined according to a random selection procedure, and retraining one or more models of the plurality of models based at least in part on routing the second subset, routing the first subset, or both.

Some examples of the method, apparatuses, and non-transitory computer-readable medium described herein may further include operations, features, means, or instructions for receiving a first plurality of data objects for the process flow during a first time window, routing the first plurality of data objects using the model inserted at the decision point based at least in part on receiving the first plurality of data objects during the first time window, receiving a second plurality of data objects for the process flow during a second time window, routing the second plurality of data objects using the random routing procedure based at least in part on receiving the second plurality of data objects during the second time window, and retraining one or more models of the plurality of models based at least in part on routing the second plurality of data objects, routing the first plurality of data objects, or both.

Some examples of the method, apparatuses, and non-transitory computer-readable medium described herein may further include operations, features, means, or instructions for determining one or more KPIs for the process flow based at least in part on routing a plurality of data objects using the model inserted at the decision point and triggering retraining of one or more models of the plurality of models based at least in part on the one or more KPIs failing to satisfy a performance threshold.

Some examples of the method, apparatuses, and non-transitory computer-readable medium described herein may further include operations, features, means, or instructions for determining an update to the process flow, deactivating the model inserted at the decision point of the process flow in response to the update to the process flow, reactivating the random routing procedure for the process flow in response to the update to the process flow, and retraining one or more models of the plurality of models based at least in part on reactivating the random routing procedure for the process flow.

In some examples of the method, apparatuses, and non-transitory computer-readable medium described herein, the update to the process flow comprises a new path for the process flow, a new operation for a path of the process flow, a new KPI for the process flow, a new feature of a data object associated with the process flow, or a combination thereof.

Some examples of the method, apparatuses, and non-transitory computer-readable medium described herein may further include operations, features, means, or instructions for determining the model from the plurality of models based at least in part on respective Qini curves corresponding to the plurality of models, respective Qini coefficients corresponding to the plurality of models, or a combination thereof, wherein the model may be inserted into the process flow based at least in part on the determining.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for determining intelligent routing at a processing device, comprising:
   receiving, from a database system, a first data object comprising one or more data field values according to a data object schema of the database system, the first data object corresponding to customer data stored in a customer relationship management (CRM) system, and the one or more data field values comprising at least one non-numerical value, the at least one non-numerical value being a string value or a categorical value;
   transforming, at the processing device, the one or more data field values of the first data object into one or more first features associated with a process flow, the transforming comprising generating at least one vector corresponding to the at least one non-numerical value;
   routing, at the processing device, the first data object to a first path of a plurality of paths of the process flow using a random routing procedure, the routing comprising performing one or more operations associated with the first path using the one or more first features of the first data object;
   training, at the processing device, a plurality of machine learning models based at least in part on an outcome of performing the one or more operations using the one or more first features of the first data object and a plurality of respective key performance indicators for the plurality of machine learning models;
   inserting, at the processing device, a trained model of the plurality of machine learning models into the process flow at a decision point between the plurality of paths based at least in part on the training;
   receiving, from the database system, a second data object comprising one or more second data field values corresponding to one or more second features associated with the process flow;
   routing, at the processing device, the second data object to a second path of the plurality of paths for the process flow using the trained model inserted at the decision point and the one or more second features of the second data object; and
   triggering, at the processing device, retraining of one or more models of the plurality of machine learning models based at least in part on one or more key performance indicators for the trained model inserted at the decision point failing to satisfy a performance threshold.

2. The method of claim 1, further comprising:
   receiving, from a user device and based at least in part on a user input, an indication of a key performance indicator for the process flow, wherein the outcome of performing the one or more operations using the one or more first features of the first data object is based at least in part on the key performance indicator.

3. The method of claim 1, further comprising:
transmitting, to a user device, an indication of the trained model based at least in part on a performance metric of the trained model; and
receiving, from the user device and in response to the indication of the trained model, a user selection of the trained model, wherein the trained model is inserted into the process flow based at least in part on the user selection of the trained model.

4. The method of claim 1, further comprising:
storing training information comprising the one or more first features of the first data object, an indication of the first path to which the first data object is routed, and the outcome of performing the one or more operations using the one or more first features of the first data object, wherein updating the plurality of machine learning models is based at least in part on the training information.

5. The method of claim 4, further comprising:
detecting, based at least in part on the training information, a potential bias in the random routing procedure of at least one feature of the one or more first features towards at least one path of the plurality of paths for the process flow; and
transmitting, to a user device, an indication of the potential bias in the random routing procedure.

6. The method of claim 5, further comprising:
receiving, from the user device and in response to the indication of the potential bias, a request to ignore the potential bias, wherein the trained model is inserted into the process flow based at least in part on the request to ignore the potential bias.

7. The method of claim 5, further comprising:
receiving, from the user device and in response to the indication of the potential bias, a request to address the potential bias; and
removing the trained model from the decision point between the plurality of paths based at least in part on the request to address the potential bias.

8. The method of claim 5, further comprising:
determining that a percentage of data objects comprising the at least one feature and routed to the at least one path is greater than a threshold percentage, wherein the potential bias is detected based at least in part on the determining.

9. The method of claim 1, further comprising:
receiving a plurality of data objects for the process flow;
routing a first subset of the plurality of data objects using the trained model inserted at the decision point;
routing a second subset of the plurality of data objects using the random routing procedure, wherein the first subset and the second subset are determined according to a random selection procedure; and
retraining at least one model of the plurality of machine learning models based at least in part on routing the second subset, routing the first subset, or both.

10. The method of claim 1, further comprising:
receiving a first plurality of data objects for the process flow during a first time window;
routing the first plurality of data objects using the trained model inserted at the decision point based at least in part on receiving the first plurality of data objects during the first time window;
receiving a second plurality of data objects for the process flow during a second time window;
routing the second plurality of data objects using the random routing procedure based at least in part on receiving the second plurality of data objects during the second time window; and
retraining at least one model of the plurality of machine learning models based at least in part on routing the second plurality of data objects, routing the first plurality of data objects, or both.

11. The method of claim 1, further comprising:
determining an update to the process flow;
deactivating the trained model inserted at the decision point of the process flow in response to the update to the process flow;
reactivating the random routing procedure for the process flow in response to the update to the process flow; and
retraining at least one model of the plurality of machine learning models based at least in part on reactivating the random routing procedure for the process flow.

12. The method of claim 11, wherein the update to the process flow comprises a new path for the process flow, a new operation for a path of the process flow, a new key performance indicator for the process flow, a new feature of a data object associated with the process flow, or a combination thereof.

13. An apparatus for determining intelligent routing at a processing device, comprising:
a processor;
memory coupled with the processor; and
instructions stored in the memory and executable by the processor to cause the apparatus to:
receive, from a database system, a first data object comprising one or more data field values according to a data object schema of the database system, the first data object corresponding to customer data stored in a customer relationship management (CRM) system, and the one or more data field values comprising at least one non-numerical value, the at least one non-numerical value being a string value or a categorical value;
transform, at the processing device, the one or more data field values of the first data object into one or more first features associated with a process flow, the transforming comprising generating at least one vector corresponding to the at least one non-numerical value;
route, at the processing device, the first data object to a first path of a plurality of paths of the process flow using a random routing procedure, the routing comprising performing one or more operations associated with the first path using the one or more first features of the first data object;
train, at the processing device, a plurality of machine learning models based at least in part on an outcome of performing the one or more operations using the one or more first features of the first data object and a plurality of respective key performance indicators for the plurality of machine learning models;
insert, at the processing device, a trained model of the plurality of machine learning models into the process flow at a decision point between the plurality of paths based at least in part on the training;
receive, from the database system, a second data object comprising one or more second data field values corresponding to one or more second features associated with the process flow;
route, at the processing device, the second data object to a second path of the plurality of paths for the process flow using the trained model inserted at the decision point and the one or more second features of the second data object; and trigger, at the processing device, retraining of one or more models of the plurality of machine learning models based at least in part on one or more key performance indicators for the trained model inserted at the decision point failing to satisfy a performance threshold.

14. The apparatus of claim 13, wherein the instructions are further executable by the processor to cause the apparatus to:

receive, from a user device and based at least in part on a user input, an indication of a key performance indicator for the process flow, wherein the outcome of performing the one or more operations using the one or more first features of the first data object is based at least in part on the key performance indicator.

15. A non-transitory computer-readable medium storing code for determining intelligent routing at a processing device, the code comprising instructions executable by a processor to:

receive, from a database system, a first data object comprising one or more data field values according to a data object schema of the database system, the first data object corresponding to customer data stored in a customer relationship management (CRM) system, and the one or more data field values comprising at least one non-numerical value, the at least one non-numerical value being a string value or a categorical value;

transform, at the processing device, the one or more data field values of the first data object into one or more first features associated with a process flow, the transforming comprising generating at least one vector corresponding to the at least one non-numerical value;

route, at the processing device, the first data object to a first path of a plurality of paths of the process flow using a random routing procedure, the routing comprising performing one or more operations associated with the first path using the one or more first features of the first data object;

train, at the processing device, a plurality of machine learning models based at least in part on an outcome of performing the one or more operations using the one or more first features of the first data object and a plurality of respective key performance indicators for the plurality of machine learning models;

insert, at the processing device, a trained model of the plurality of machine learning models into the process flow at a decision point between the plurality of paths based at least in part on the training;

receive, from the database system, a second data object comprising one or more second data field values corresponding to one or more second features associated with the process flow;

route, at the processing device, the second data object to a second path of the plurality of paths for the process flow using the trained model inserted at the decision point and the one or more second features of the second data object; and trigger, at the processing device, retraining of one or more models of the plurality of machine learning models based at least in part on one or more key performance indicators for the trained model inserted at the decision point failing to satisfy a performance threshold.

* * * * *